(12) United States Patent
Dai

(10) Patent No.: US 10,203,477 B2
(45) Date of Patent: Feb. 12, 2019

(54) WIDE ANGLE LENS

(71) Applicant: ZHEJIANG SUNNY OPTICS CO.,LTD., Ningbo, Zhejiang (CN)

(72) Inventor: Fujian Dai, Zhejiang (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/569,300

(22) PCT Filed: Sep. 21, 2016

(86) PCT No.: PCT/CN2016/099627
§ 371 (c)(1),
(2) Date: Oct. 25, 2017

(87) PCT Pub. No.: WO2018/028026
PCT Pub. Date: Feb. 15, 2018

(65) Prior Publication Data
US 2018/0314039 A1   Nov. 1, 2018

(30) Foreign Application Priority Data

Aug. 8, 2016   (CN) .......................... 2016 1 0643600

(51) Int. Cl.
*G02B 9/62*   (2006.01)
*G02B 9/64*   (2006.01)
*G02B 13/00*  (2006.01)

(52) U.S. Cl.
CPC .................. *G02B 9/62* (2013.01); *G02B 9/64* (2013.01); *G02B 13/00* (2013.01); *G02B 13/0045* (2013.01)

(58) Field of Classification Search
CPC . G02B 9/62; G02B 9/64; G02B 13/00; G02B 13/06; G02B 13/0045
See application file for complete search history.

(56) References Cited

U.S. PATENT DOCUMENTS 8,743,477 B2   6/2014   Tsai et al.
8,953,261 B2   2/2015   Tsai
(Continued)

FOREIGN PATENT DOCUMENTS

CN   103792646 A   5/2014
CN   105204143 A   12/2015
(Continued)

OTHER PUBLICATIONS

International Search Report and Written Opinion dated Apr. 27, 2017 for corresponding International Application No. PCT/CN2016/099627, filed Sep. 21, 2016.
(Continued)

*Primary Examiner* — Darryl J Collins
*Assistant Examiner* — Journey F Sumlar
(74) *Attorney, Agent, or Firm* — David D. Brush; Westman, Champlin & Koehler P.A.

(57) ABSTRACT

A wide angle lens includes in sequence from an object side to an image side: a first lens having a negative refractive power and a concave image-side surface; a second lens having a positive refractive power; a third lens having a positive refractive power, a convex object-side surface and convex image-side surface; a fourth lens having a negative refractive power; a fifth lens having a positive refractive power and a convex an image-side surface; and a sixth lens having a negative refractive power and an image-side surface that is concave in a paraxial region. The wide angle lens satisfies a conditional expression: $1.0 \leq f2/f \leq 2.0$, $0.5 \leq f1/f4 \leq 1.5$, in which, f1 denotes an effective focal length of the first lens, f2 denotes an effective focal length of the second lens, f4 denotes an effective focal length of the fourth lens, and f denotes an effective focal length of the wide angle lens.

13 Claims, 24 Drawing Sheets

(56) References Cited

U.S. PATENT DOCUMENTS

| | | |
|---|---|---|
| 2014/0247507 A1 | 9/2014 | Tsai |
| 2015/0268446 A1* | 9/2015 | Chen .................. G02B 9/62 348/148 |
| 2016/0147044 A1 | 5/2016 | Kondo |
| 2016/0161717 A1 | 6/2016 | Chae |
| 2016/0178871 A1 | 6/2016 | You |
| 2016/0223796 A1* | 8/2016 | Lee .................. G02B 9/62 |

FOREIGN PATENT DOCUMENTS

| | | |
|---|---|---|
| CN | 105676417 A | 6/2016 |
| CN | 105717611 A | 6/2016 |
| JP | H11316339 A | 11/1999 |
| JP | 2016065954 A | 4/2016 |
| TW | I451121 B | 9/2014 |

OTHER PUBLICATIONS

English translation of Office Action dated Jun. 28, 2018from State Intellectual Property Office for CN Application 201610643600.9.
English translation of an Office Action from the Japanese Patent Office dated Oct. 24, 2018, for corresponding JP Application No. 2017556190.

* cited by examiner

WIDE ANGLE LENS

CROSS-REFERENCE TO RELATED APPLICATIONS

This Application is a Section 371 National Stage Application of International Application No. PCT/CN2016/099627, filed on Sep. 21, 2016, not yet published, which is based on and claims priority to and benefit of Chinese Patent Application Serial No. 201610643600.9, filed with the State Intellectual Property Office of P. R. China on Aug. 8, 2016, the contents of which are hereby incorporated by reference in their entireties.

FIELD

The present disclosure relates to a field of optical imaging, and more particularly to a wide angle lens.

BACKGROUND

Generally, a photosensitive element in an optical imaging system includes a charge-coupled device (CCD) or a complementary metal-oxide semiconductor (CMOS) imaging sensor. With the development of semiconductor process technology, a pixel size of the photosensitive element is smaller and smaller, and correspondingly a camera lens is also required to have a small dimension and a high imaging quality.

Meanwhile, with the increasingly wide application field of the camera lens, a coverage is required to be wider and wider. Thus, to satisfy the requirements for a large field angle, it is generally to increase the amount of lens, for example, U.S. Publication No. US20140247507 provides an imaging camera lens having six lenses to achieve the large field angle, but the camera lens cannot satisfy the requirements for miniaturization and light weight of the lens. In addition, to give consideration to the imaging quality, the field angle is limited to be further increased, and can't reach above 90 degrees.

SUMMARY

Embodiments of the present disclosure seek to solve at least one of problems existing in the related art to at least some extent. For that reason, a wide angle lens is provided by the present disclosure.

The wide angle lens according to embodiments of the present disclosure, in sequence from an object side to an image side, includes:

a first lens having a negative refractive power, an image-side surface of the first lens being a concave surface;

a second lens having a positive refractive power;

a third lens having a positive refractive power, an object-side surface of the third lens being a convex surface, and an image-side surface of the third lens being a convex surface;

a fourth lens having a negative refractive power;

a fifth lens having a positive refractive power, an image-side surface of the fifth lens being a convex surface; and a sixth lens having a negative refractive power, an image-side surface of the sixth lens being a concave surface in a paraxial region, the wide angle lens satisfies a conditional expression: $1.0 \leq f2/f \leq 2.0$, $0.5 \leq f1/f4 \leq 1.5$, in which, f1 denotes an effective focal length of the first lens, f2 denotes an effective focal length of the second lens, f4 denotes an effective focal length of the fourth lens, and f denotes an effective focal length of the wide angle lens.

In some embodiments, the wide angle lens satisfies a conditional expression: $-1.6 \leq f2/f6 < -0.7$, in which, f2 denotes the effective focal length of the second lens, and f6 denotes an effective focal length of the sixth lens.

In some embodiments, the wide angle lens satisfies a conditional expression: $0.8 < Dr5r8/CT5 < 1.5$, in which, Dr5r8 denotes an axial distance between the object-side surface of the third surface and an image-side surface of the fourth lens, and CT5 denotes a center thickness of the fifth lens.

In some embodiments, the wide angle lens satisfies a conditional expression: $0.5 < DT11/DT62 < 0.9$, in which, DT11 denotes a maximum effective radius of the object-side surface of the first lens, and DT62 denotes a maximum effective radius of the image-side surface of the sixth lens.

In some embodiments, the wide angle lens satisfies a conditional expression: $0 < CT6/CT5 \leq 0.6$, in which, CT5 denotes a center thickness of the fifth lens, and CT6 denotes a center thickness of the sixth lens.

In some embodiments, the wide angle lens satisfies a conditional expression: $-3 < f4/f < -1$, in which, f4 denotes the effective focal length of the fourth lens, and f denotes the effective focal length of the wide angle lens.

In some embodiments, the wide angle lens satisfies a conditional expression: $0.8 \leq f5/f < 1.5$, in which, f5 denotes an effective focal length of the fifth lens, and f denotes the effective focal length of the wide angle lens.

In some embodiments, the wide angle lens satisfies a conditional expression: $0 < (R5+R6)/(R5-R6) < 1$, in which, R5 denotes a radius of curvature of the object-side surface of the third lens, and R6 denotes a radius of curvature of the image-side surface of the third lens.

In some embodiments, the wide angle lens satisfies a conditional expression: $TTL/ImgH < 2.4$, in which, TTL denotes an axial distance between the object-side surface of the first lens to the imaging surface, and ImgH denotes a half of a diagonal line of an effective pixel area on the imaging surface.

In some embodiments, the image-side surface of the second lens is a convex surface, and the wide angle lens satisfies a conditional expression: $0 < T23/CT2 < 0.1$, in which, CT2 denotes a center thickness of the second lens, and T23 denotes an axial distance between the second lens and the third lens.

In some embodiments, the object-side surface of the sixth lens is a concave surface, and the wide angle lens satisfies a conditional expression: $-0.8 < SAG61/DT61 < -0.4$, in which, SAG61 denotes a sagitta of the object-side surface of the sixth lens, and DT61 denotes a maximum effective radius of the object-side surface of the sixth lens.

In some embodiments, the image-side surface of the second lens is a concave surface, and the wide angle lens satisfies a conditional expression: $0.5 < R3/R4 < 1.0$, in which, R3 denotes a radius of curvature of the object-side surface of the second lens, and R4 denotes a radius of curvature of the image-side surface of the second lens.

In some embodiments, the wide angle lens satisfies a conditional expression: $-0.5 < (R10+R11)/(R10-R11) < 0$, in which, R10 denotes a radius of curvature of the image-side surface of the fifth lens, and R11 denotes a radius of curvature of the object-side surface of the sixth lens.

The wide angle lens according to embodiments of the present disclosure has advantages of ultra wide angle, high resolution and small dimension and can improve the assembly processing and achieve the low cost.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and readily appreciated from descriptions made with reference to following drawings, in which.

DETAILED DESCRIPTION

Figure 1:
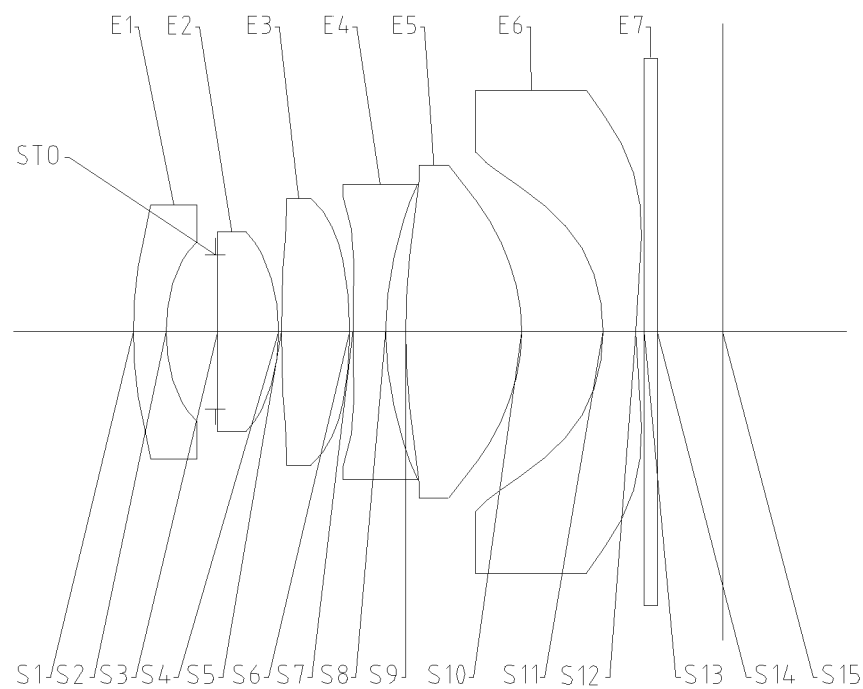
FIG. 1 is a schematic view of a wide angle lens according to embodiment 1.
Figure 2:
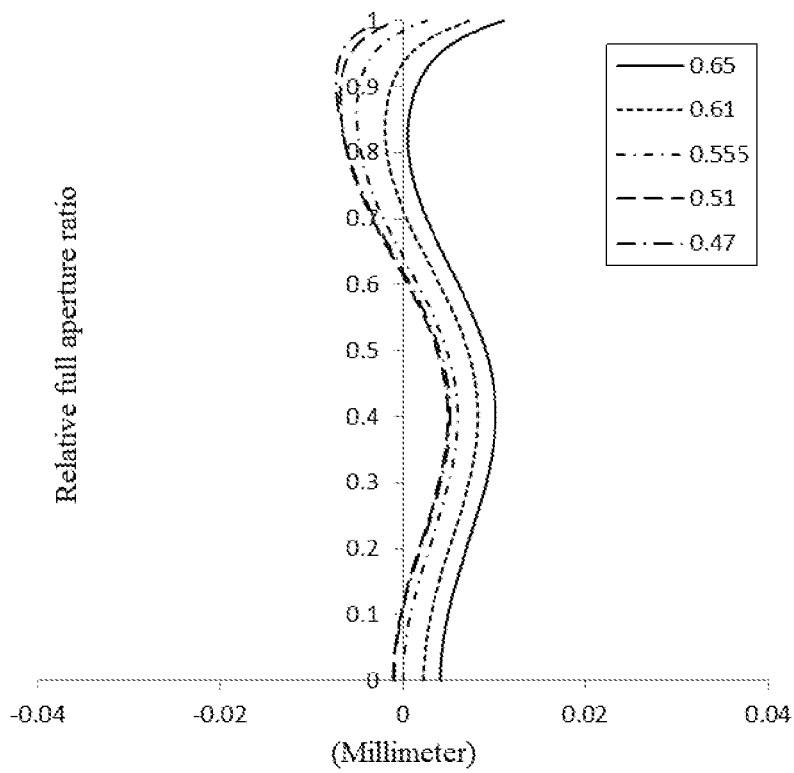
FIG. 2 is diagram showing a longitudinal aberration curve (mm) of the wide angle lens in embodiment 1.
Figure 3:
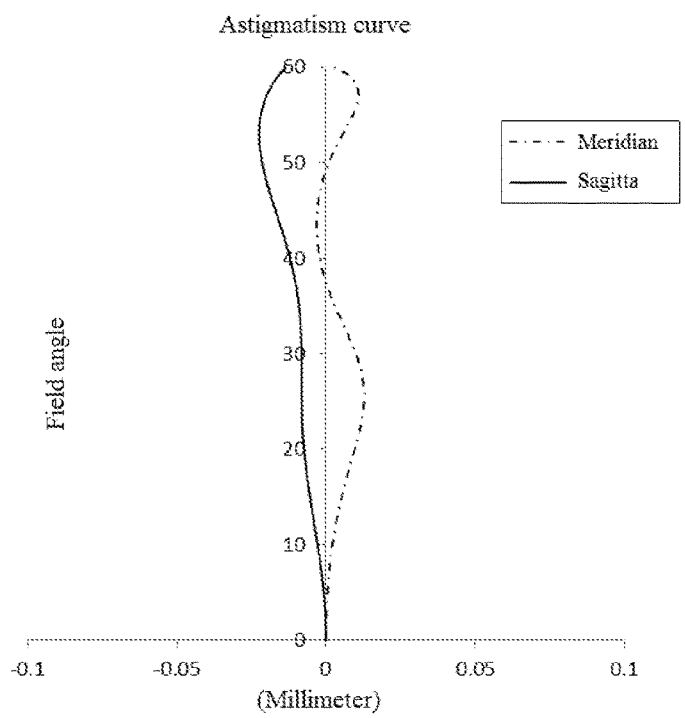
FIG. 3 is a diagram showing an astigmatism curve (mm) of the wide angle lens in embodiment 1.
Figure 4:
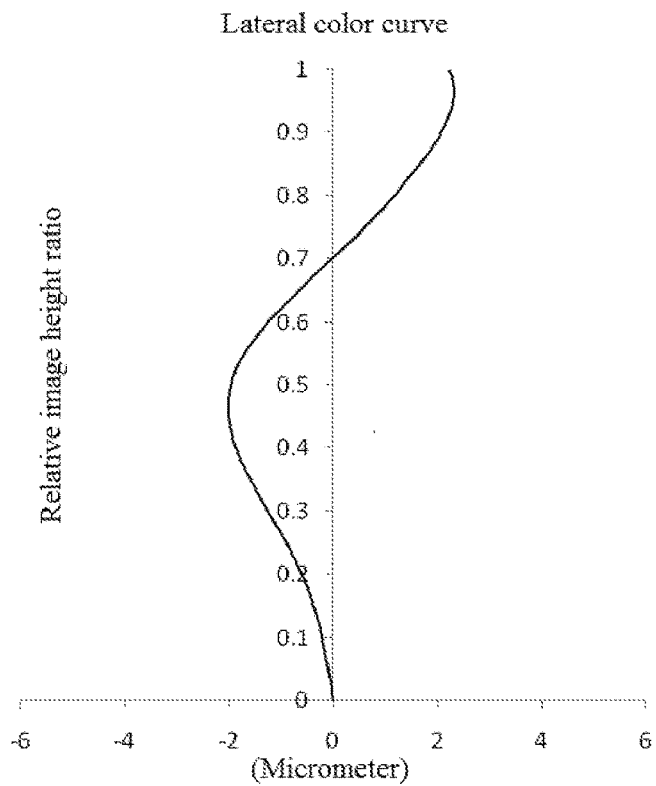
FIG. 4 is a diagram showing a lateral color curve (μm) of the wide angle lens in embodiment 1.
Figure 5:
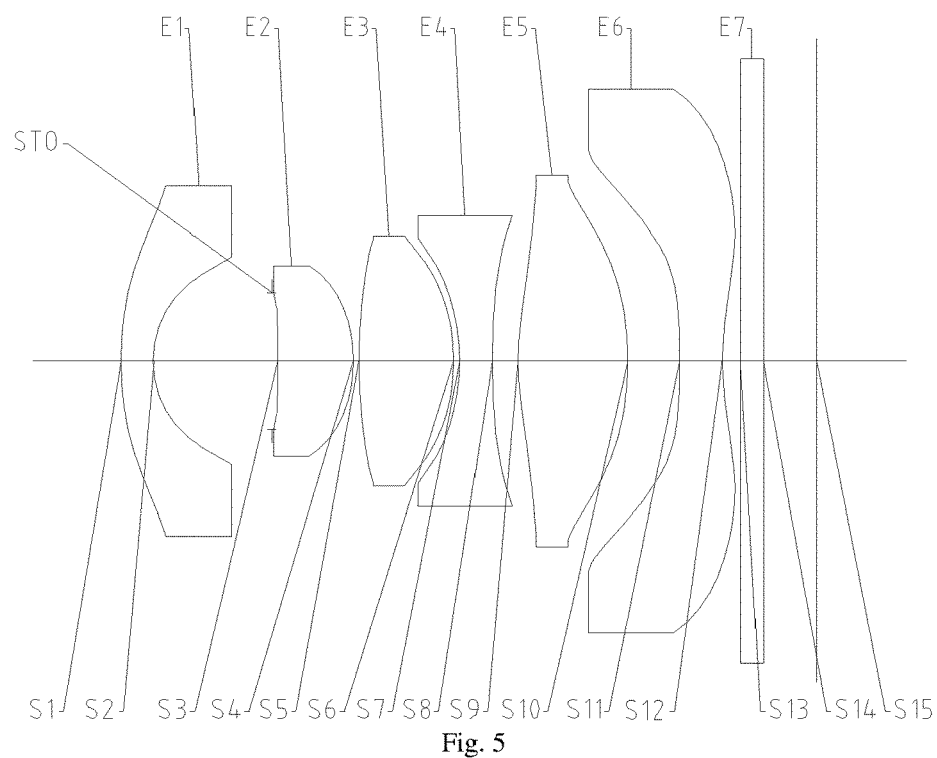
FIG. 5 is a schematic view of a wide angle lens according to embodiment 2.
Figure 6:
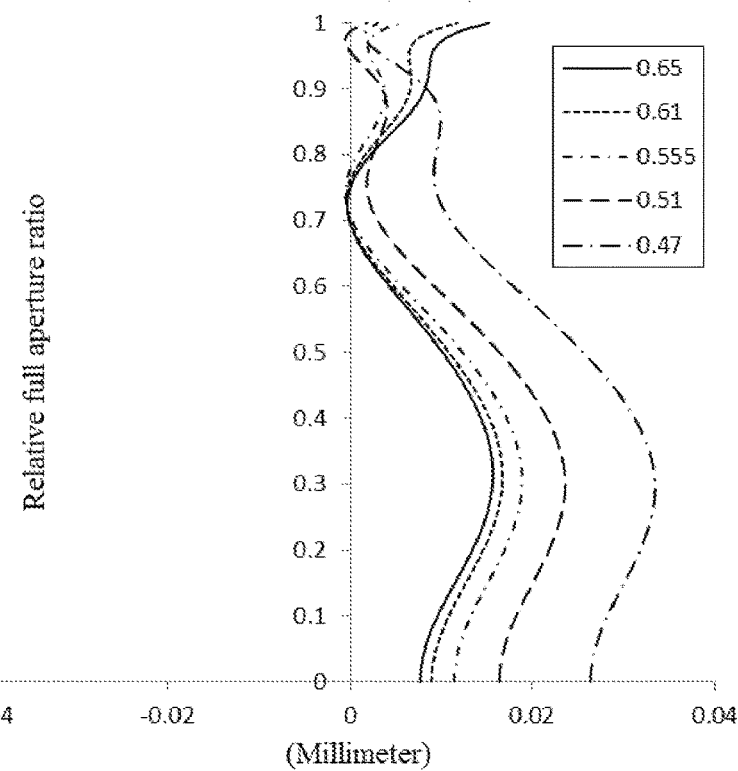
FIG. 6 is a diagram showing a longitudinal aberration curve (mm) of the wide angle lens in embodiment 2.
Figure 7:
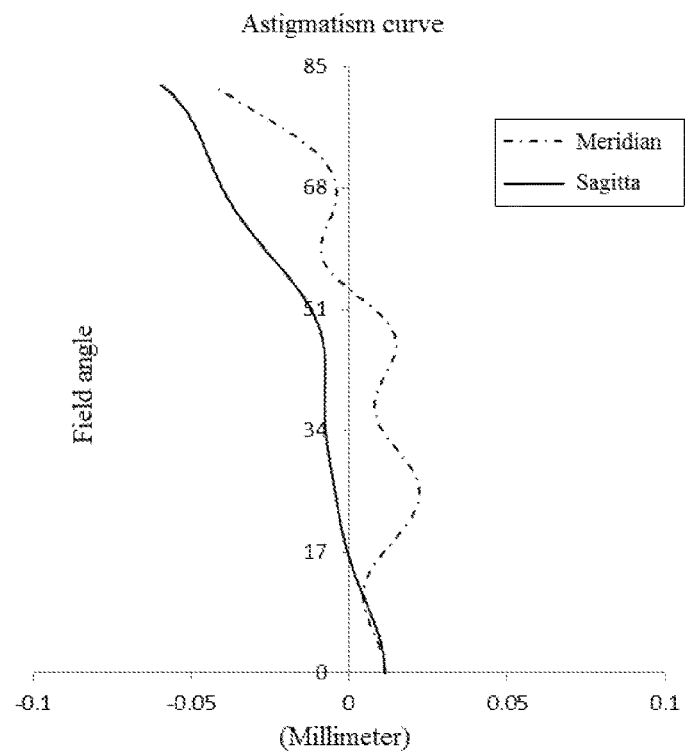
FIG. 7 is a diagram showing an astigmatism curve (mm) of the wide angle lens in embodiment 2.
Figure 8:
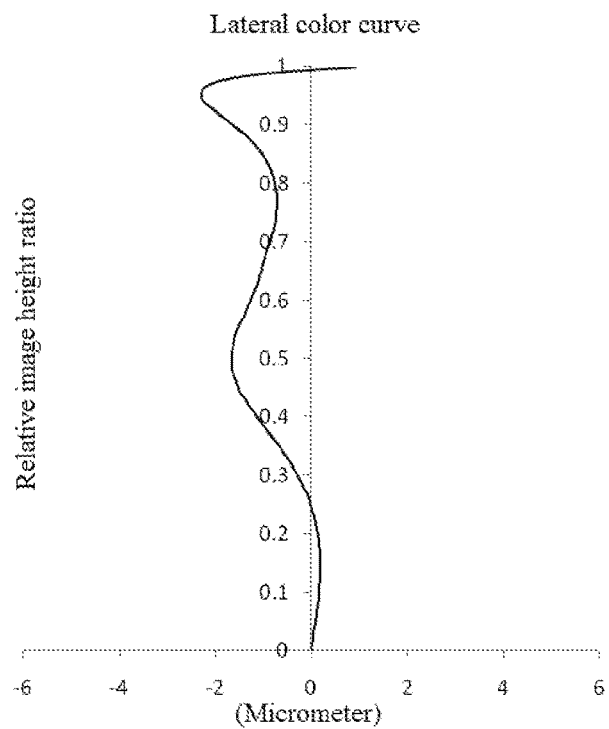
FIG. 8 is a diagram showing a lateral color curve (μm) of the wide angle lens in embodiment 2.
Figure 9:
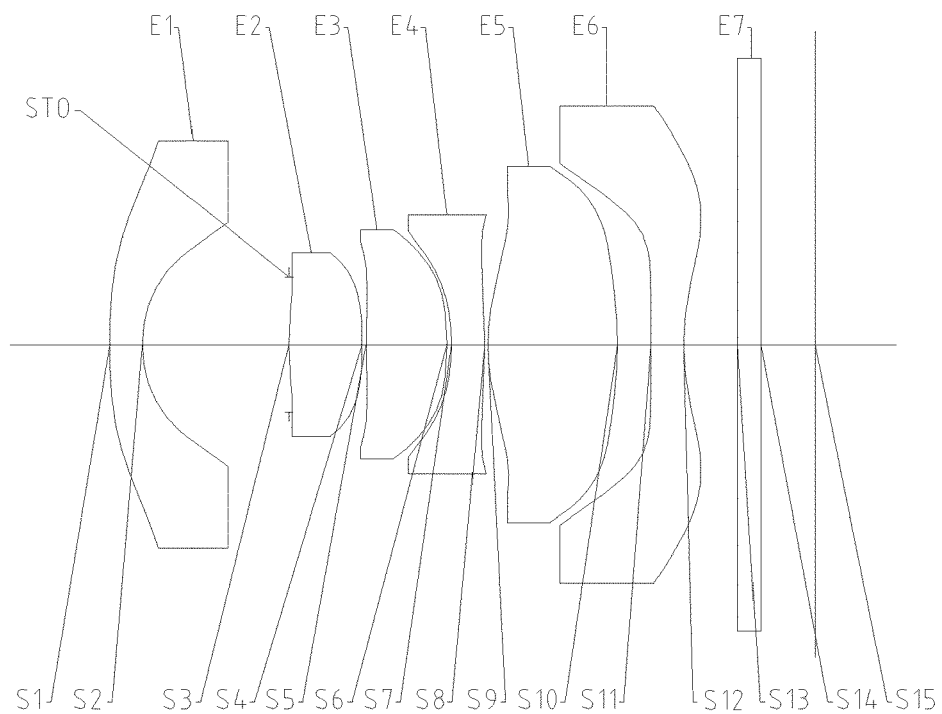
FIG. 9 is a schematic view of a wide angle lens according to embodiment 3.
Figure 10:
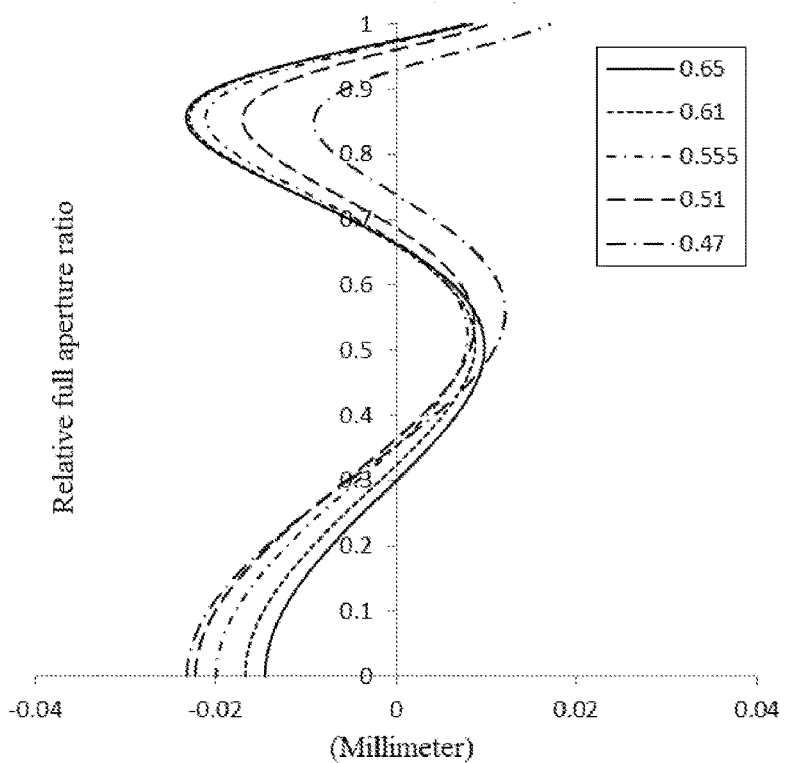
FIG. 10 is a diagram showing a longitudinal aberration curve (mm) of the wide angle lens in embodiment 3.
Figure 11:
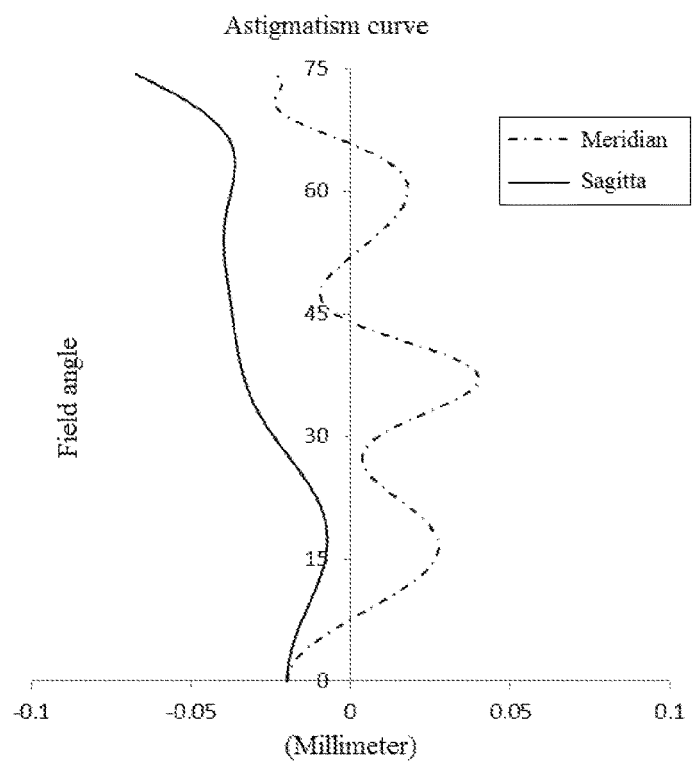
FIG. 11 is a diagram showing an astigmatism curve (mm) of the wide angle lens in embodiment 3.
Figure 12:
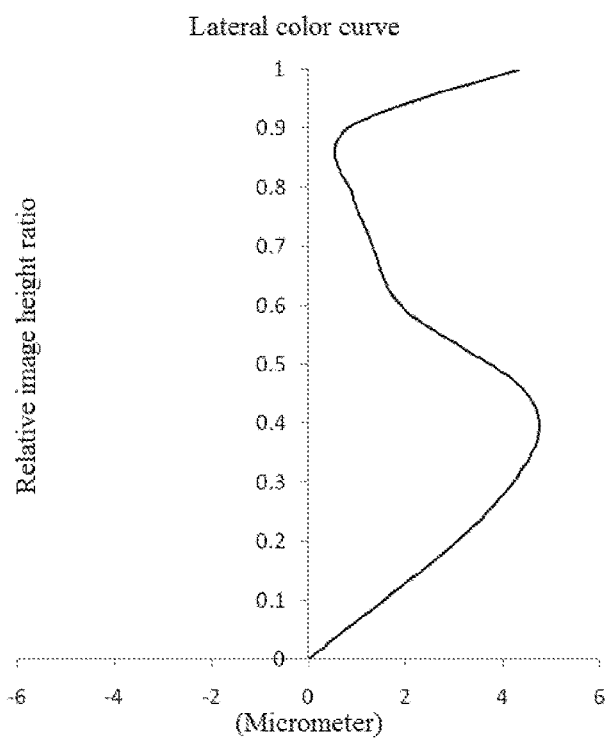
FIG. 12 is a diagram showing a lateral color curve (μm) of the wide angle lens in embodiment 3.
Figure 13:
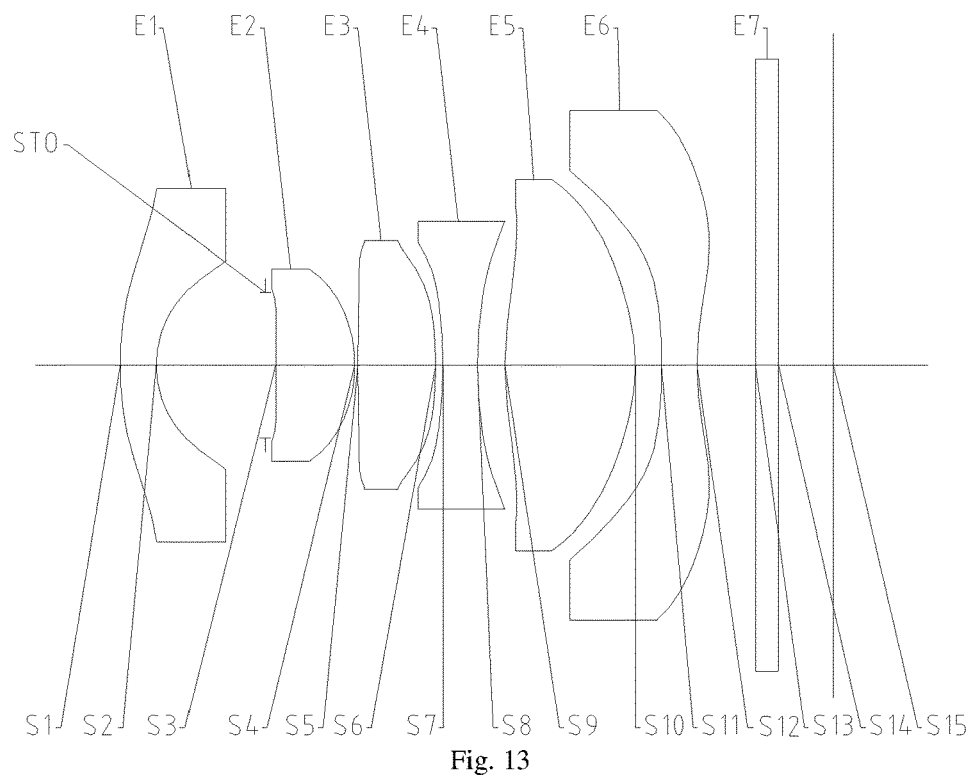
FIG. 13 is a schematic view of a wide angle lens according to embodiment 4.
Figure 14:
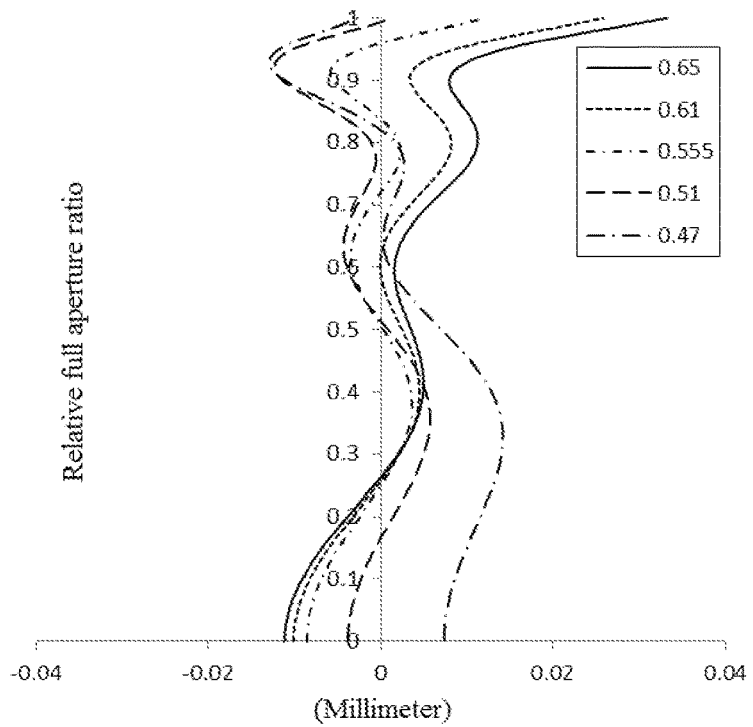
FIG. 14 is a diagram showing a longitudinal aberration curve (mm) of the wide angle lens in embodiment 4.
Figure 15:
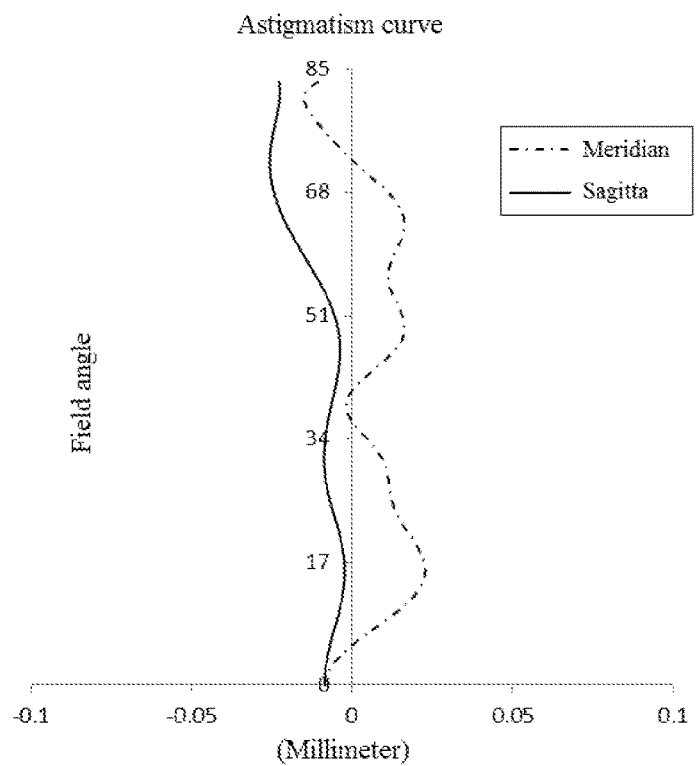
FIG. 15 is a diagram showing an astigmatism curve (mm) of the wide angle lens in embodiment 4.
Figure 16:
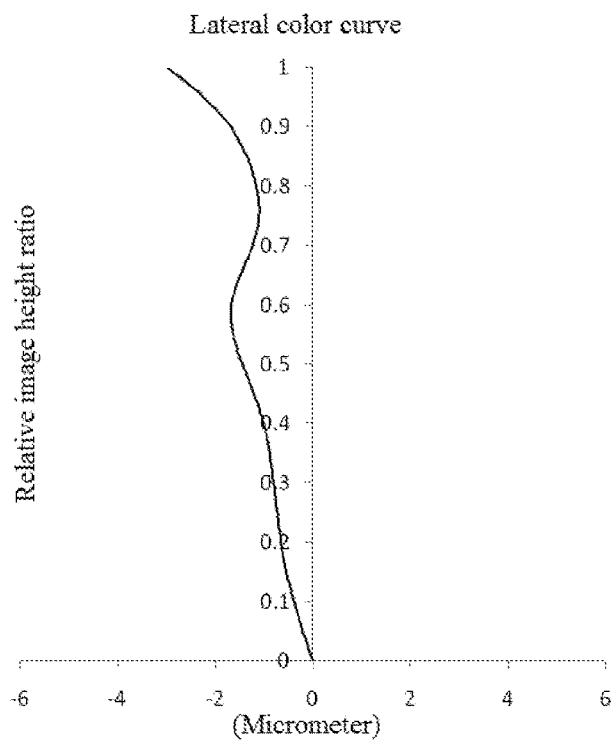
FIG. 16 is a diagram showing a lateral color curve (μm) of the wide angle lens in embodiment 4.
Figure 17:
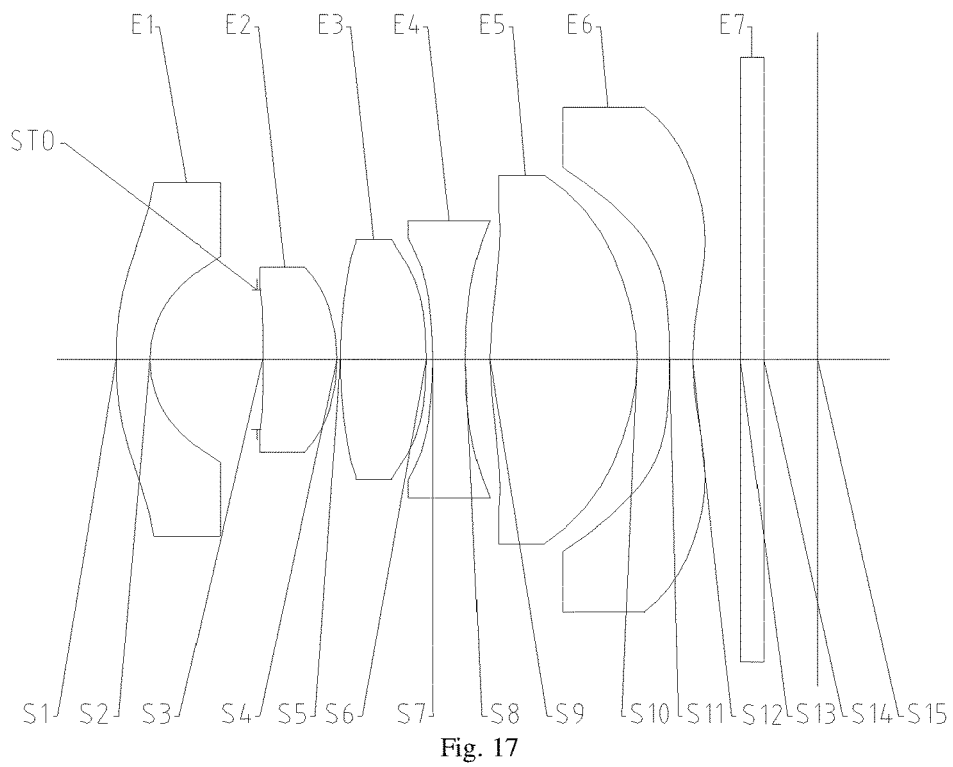
FIG. 17 is a schematic view of a wide angle lens according to embodiment 5.
Figure 18:
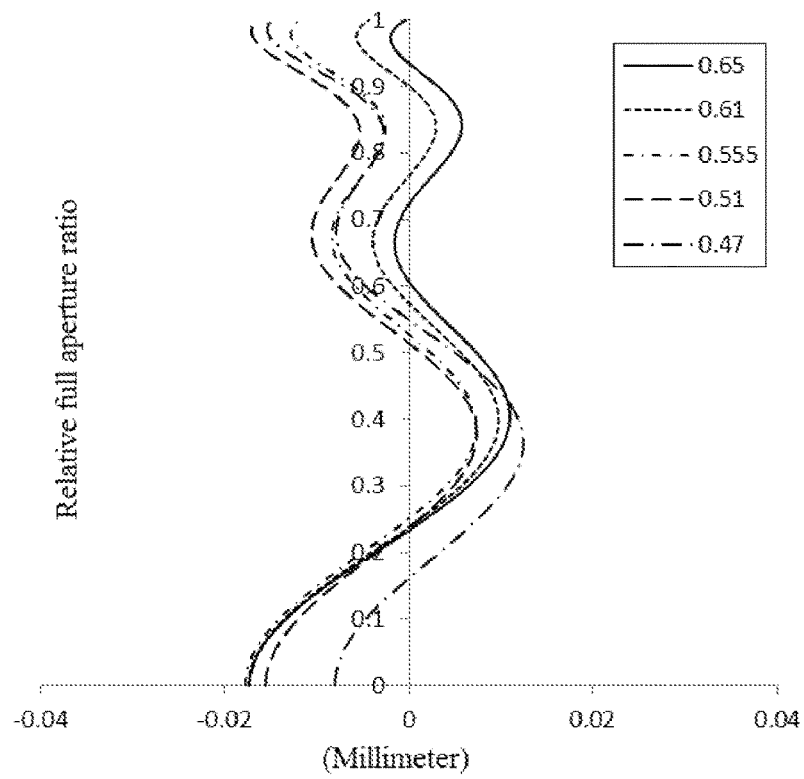
FIG. 18 is a diagram showing a longitudinal aberration curve (mm) of the wide angle lens in embodiment 5.
Figure 19:
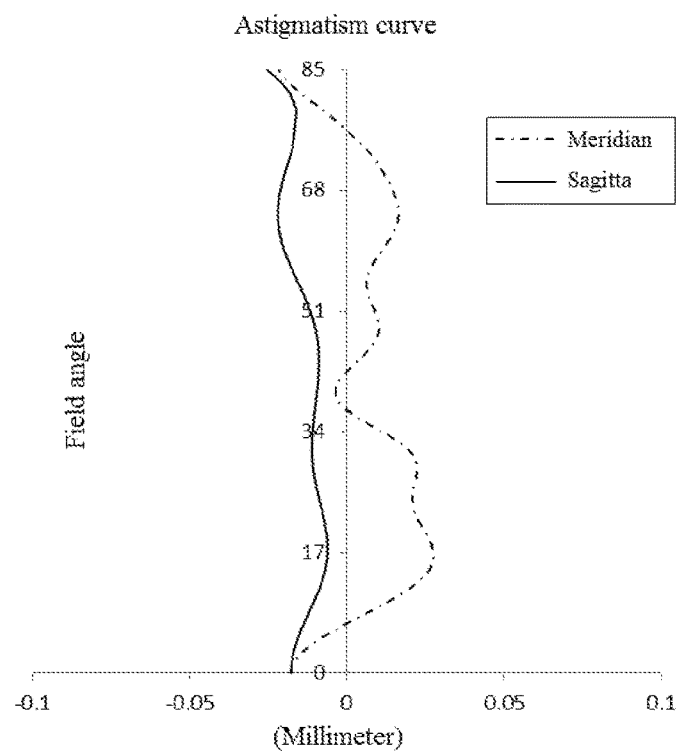
FIG. 19 is a diagram showing an astigmatism curve (mm) of the wide angle lens in embodiment 5.
Figure 20:
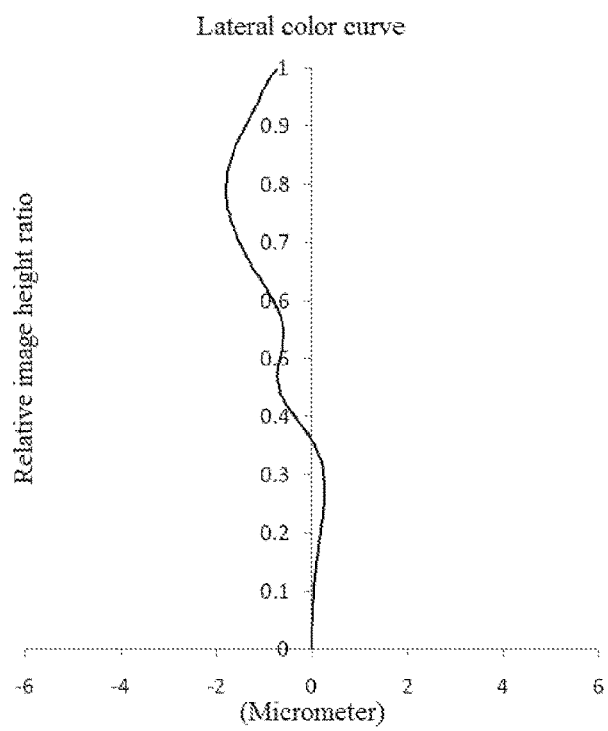
FIG. 20 is a diagram showing a lateral color curve (μm) of the wide angle lens in embodiment 5.
Figure 21:
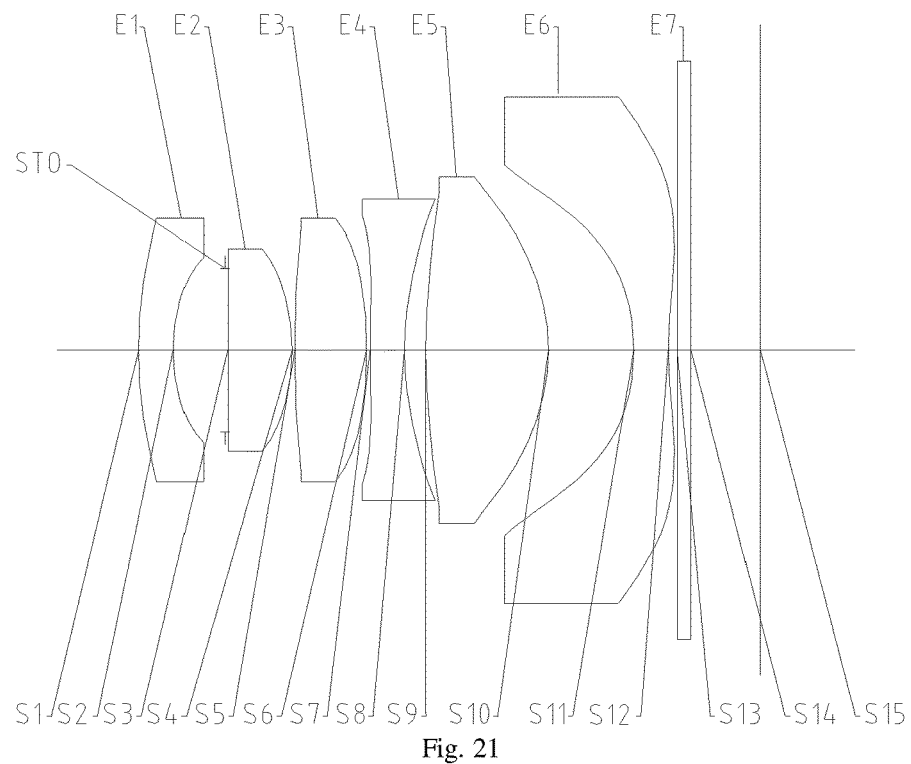
FIG. 21 is a schematic view of a wide angle lens according to embodiment 6.
Figure 22:
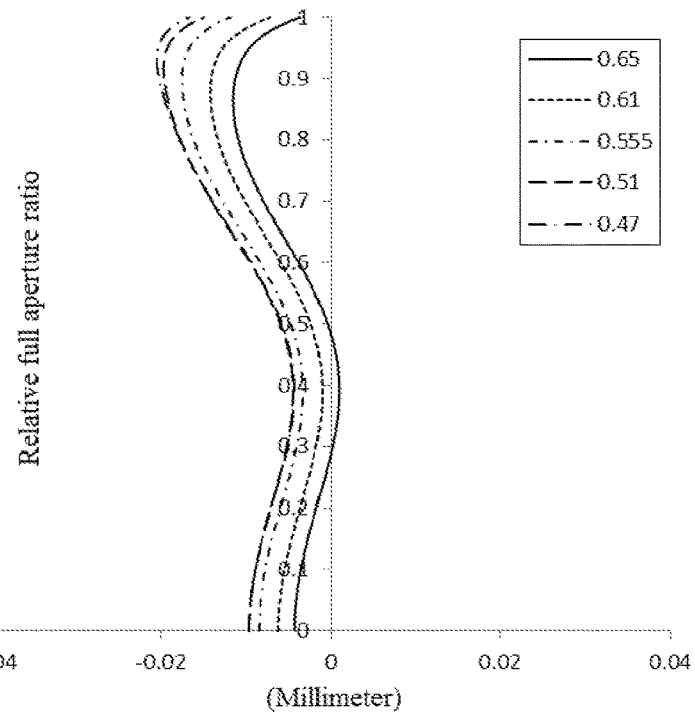
FIG. 22 is a diagram showing a longitudinal aberration curve (mm) of the wide angle lens in embodiment 6.
Figure 23:
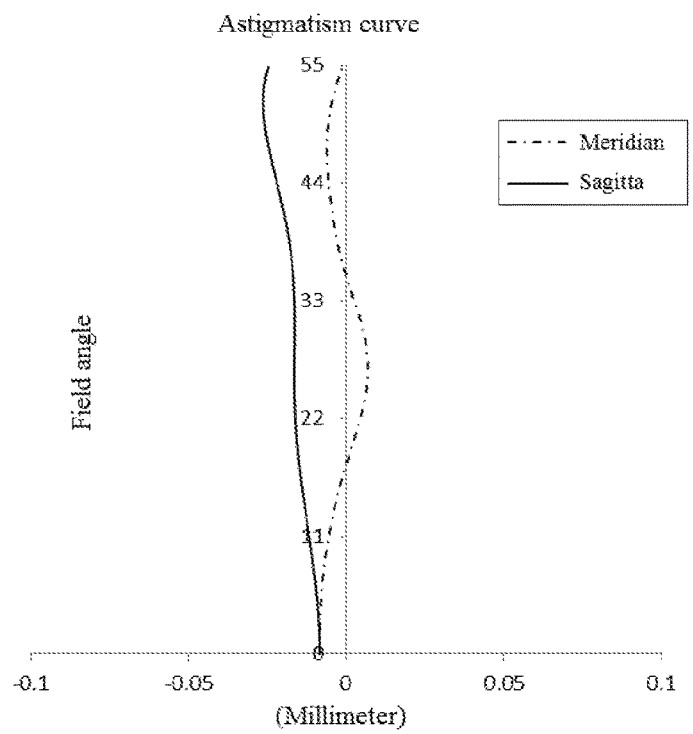
FIG. 23 is a diagram showing an astigmatism curve (mm) of the wide angle lens in embodiment 6.
Figure 24:
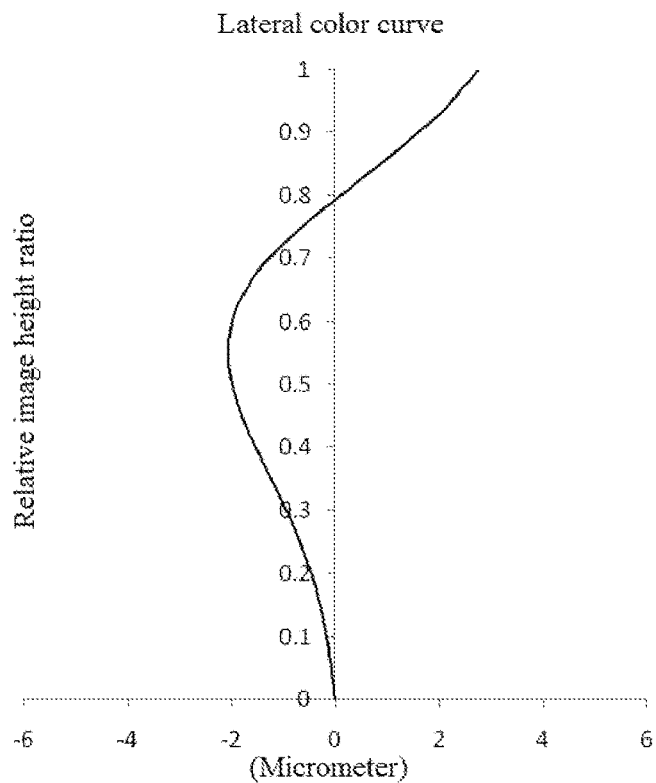
FIG. 24 is a diagram showing a lateral color curve (μm) of the wide angle lens in embodiment 6.
Figure 25:
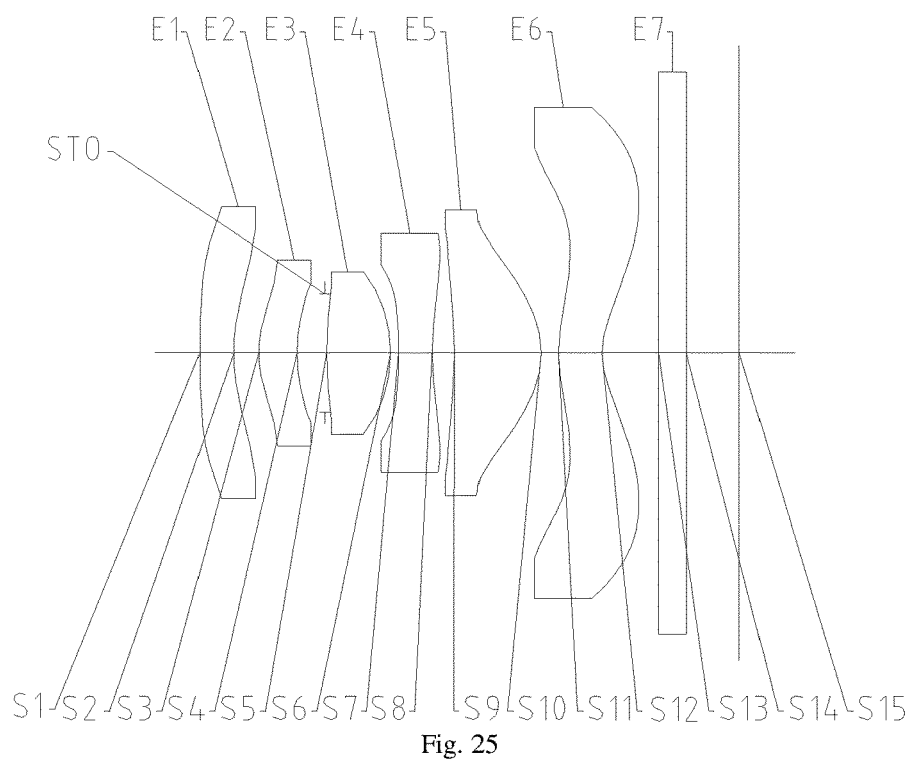
FIG. 25 is a schematic view of a wide angle lens according to embodiment 7.
Figure 26:
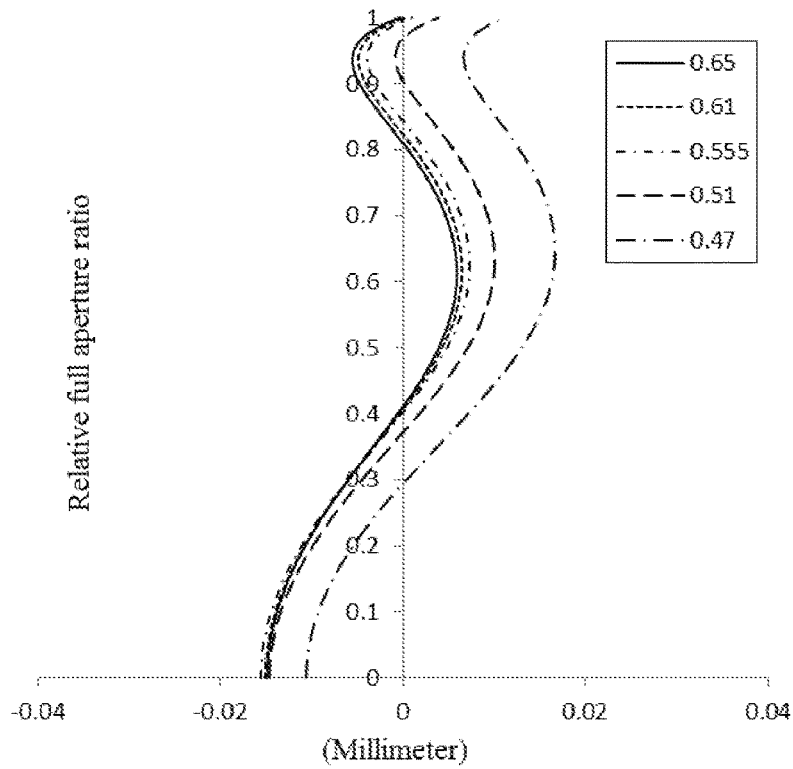
FIG. 26 is a diagram showing a longitudinal aberration curve (mm) of the wide angle lens in embodiment 7.
Figure 27:
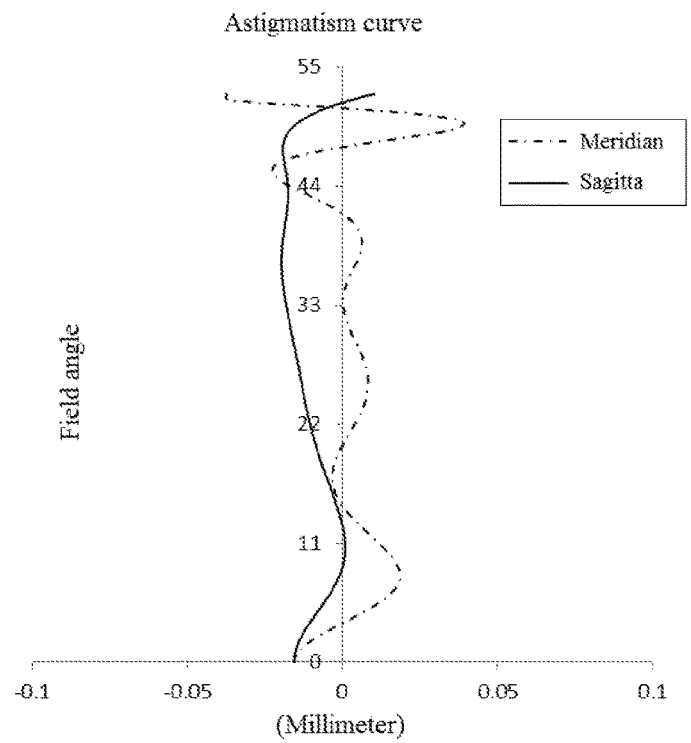
FIG. 27 is a diagram showing an astigmatism curve (mm) of the wide angle lens in embodiment 7.
Figure 28:
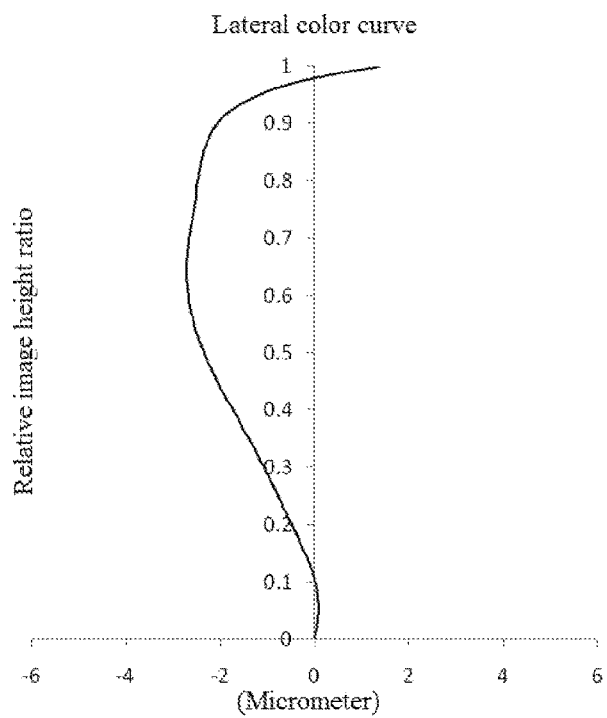
FIG. 28 is a diagram showing a lateral color curve (μm) of the wide angle lens in embodiment 7.
Figure 29:
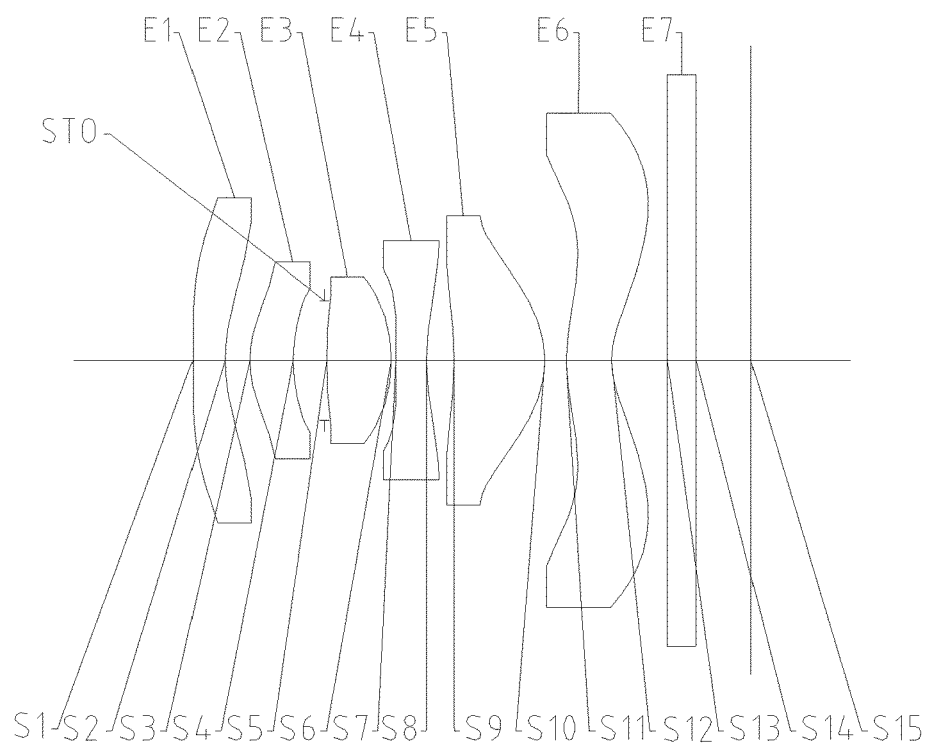
FIG. 29 is a schematic view of a wide angle lens according to embodiment 8.
Figure 30:
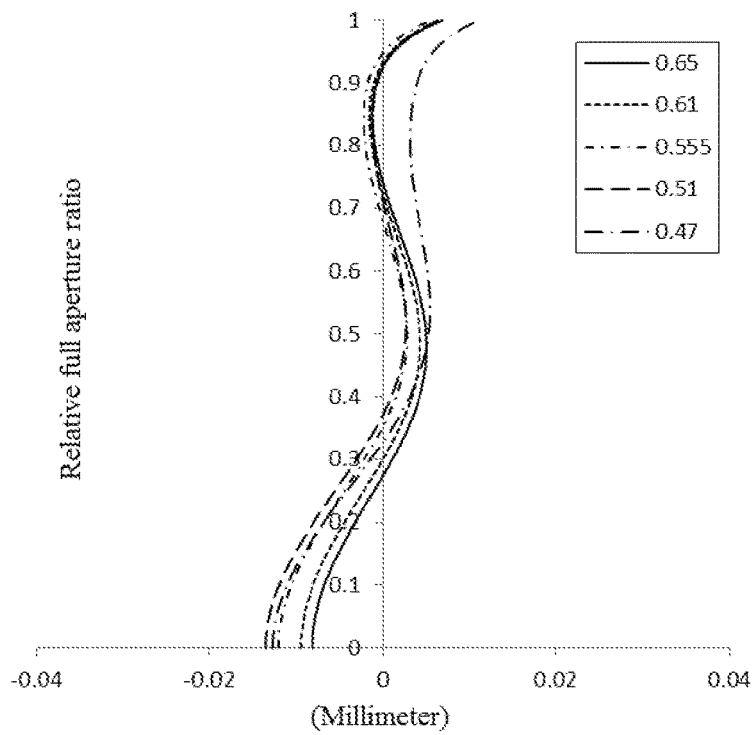
FIG. 30 is a diagram showing a longitudinal aberration curve (mm) of the wide angle lens in embodiment 8.
Figure 31:
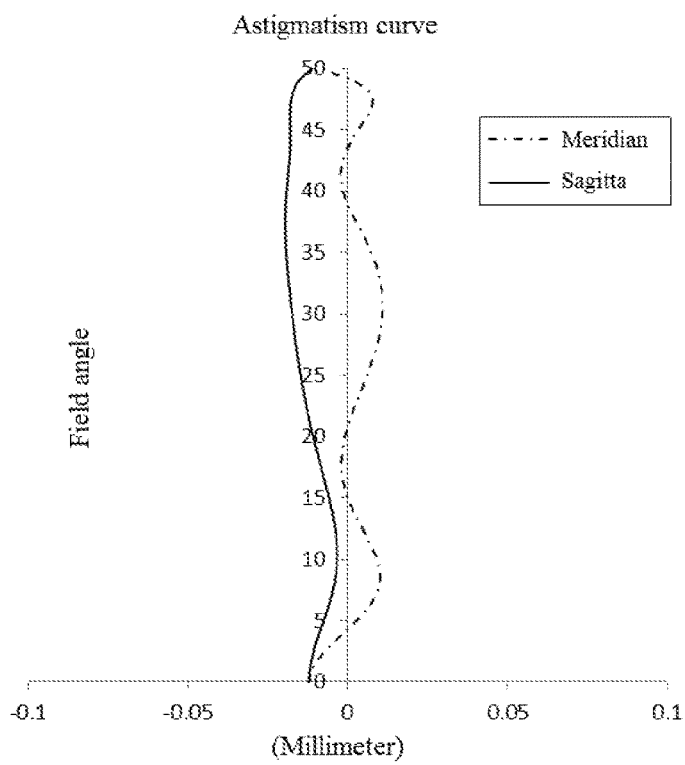
FIG. 31 is a diagram showing an astigmatism curve (mm) of the wide angle lens in embodiment 8.
Figure 32:
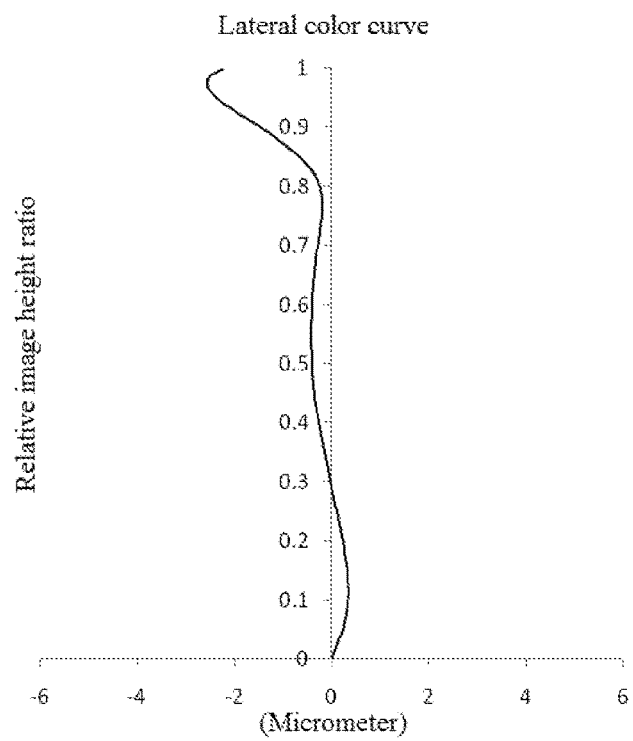
FIG. 32 is a diagram showing a lateral color curve (μm) of the wide angle lens in embodiment 8.
Figure 33:
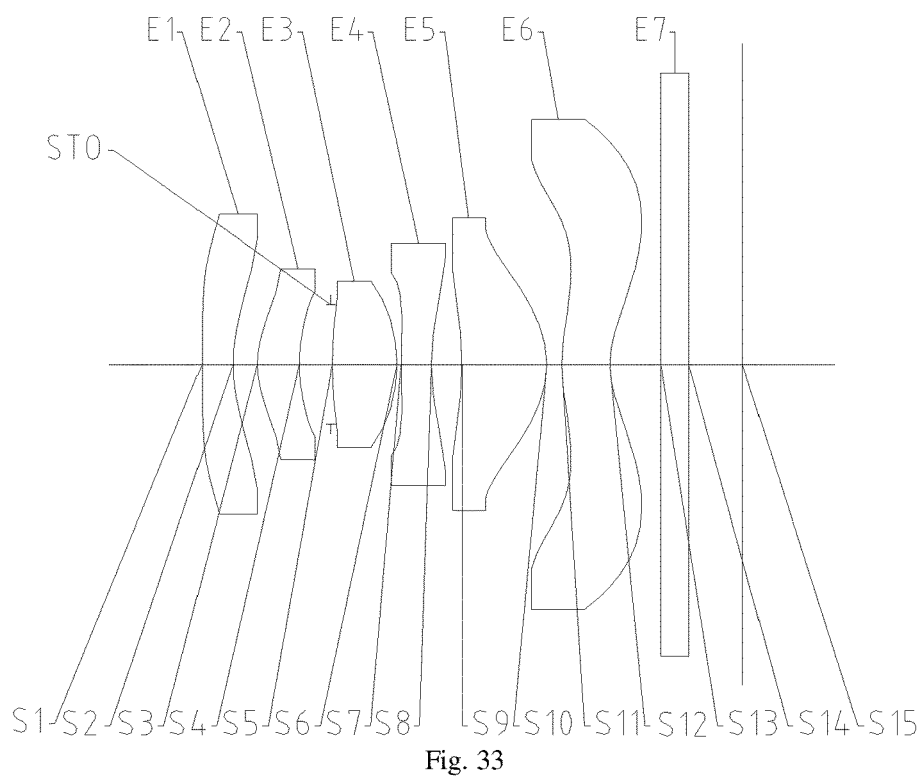
FIG. 33 is a schematic view of a wide angle lens according to embodiment 9.
Figure 34:
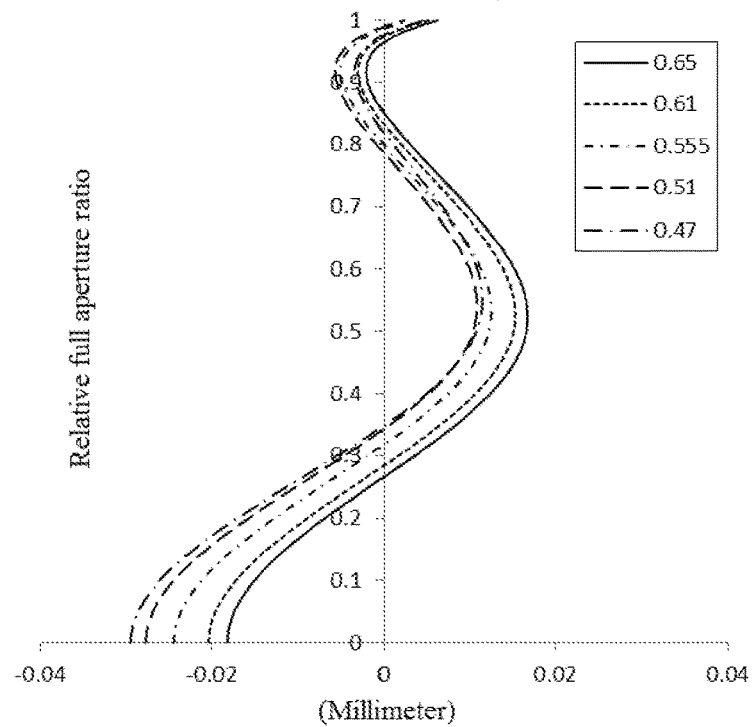
FIG. 34 is a diagram showing a longitudinal aberration curve (mm) of the wide angle lens in embodiment 9.
Figure 35:
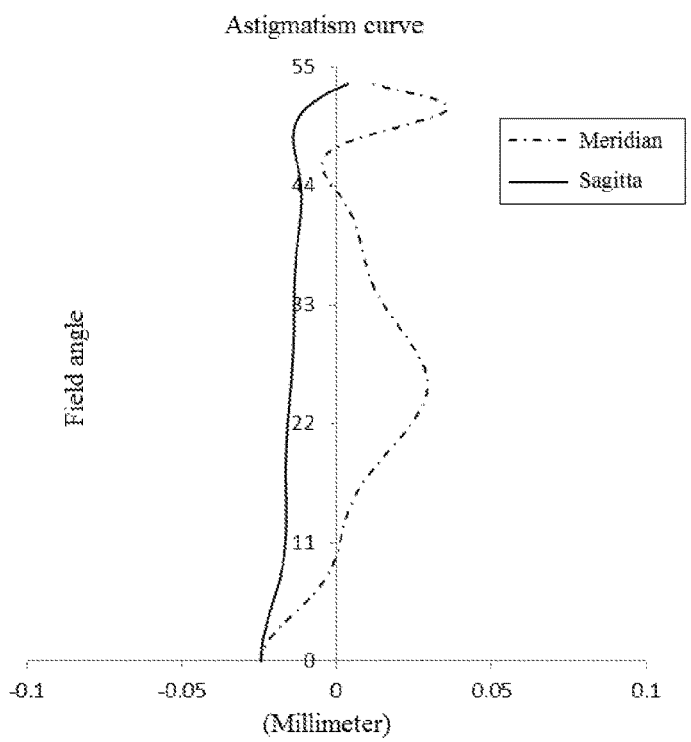
FIG. 35 is a diagram showing an astigmatism curve (mm) of the wide angle lens in embodiment 9.
Figure 36:
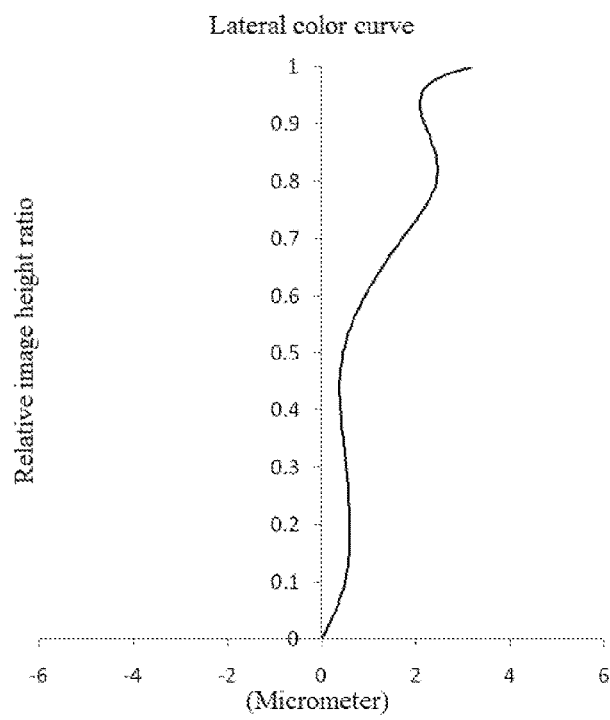
FIG. 36 is a diagram showing a lateral color curve (μm) of the wide angle lens in embodiment 9.
Figure 37:
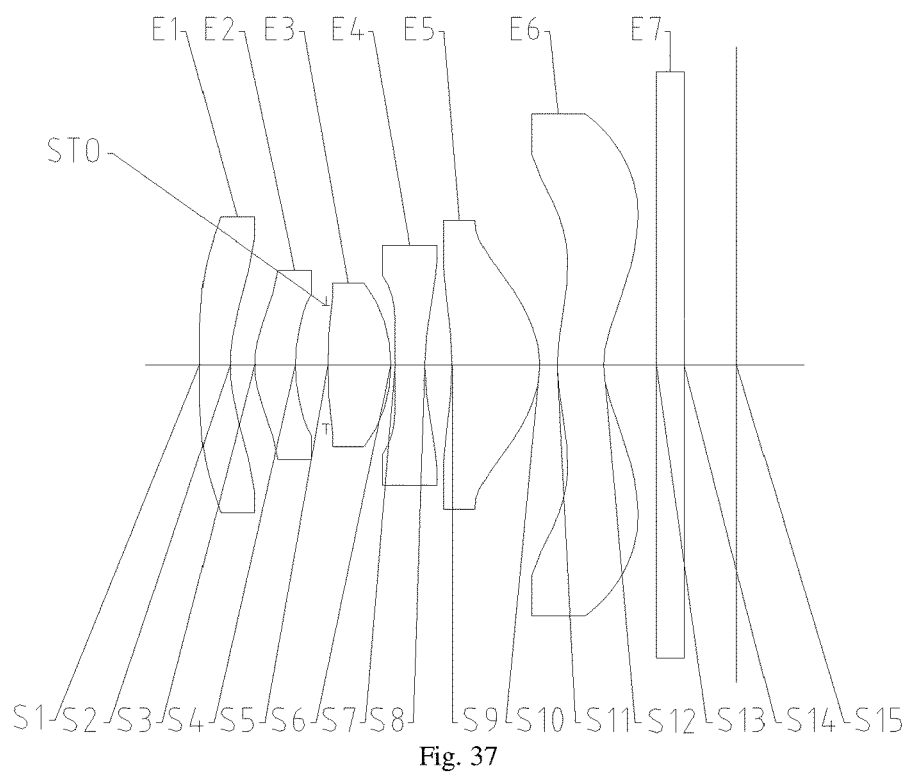
FIG. 37 is a schematic view of a wide angle lens according to embodiment 10.
Figure 38:
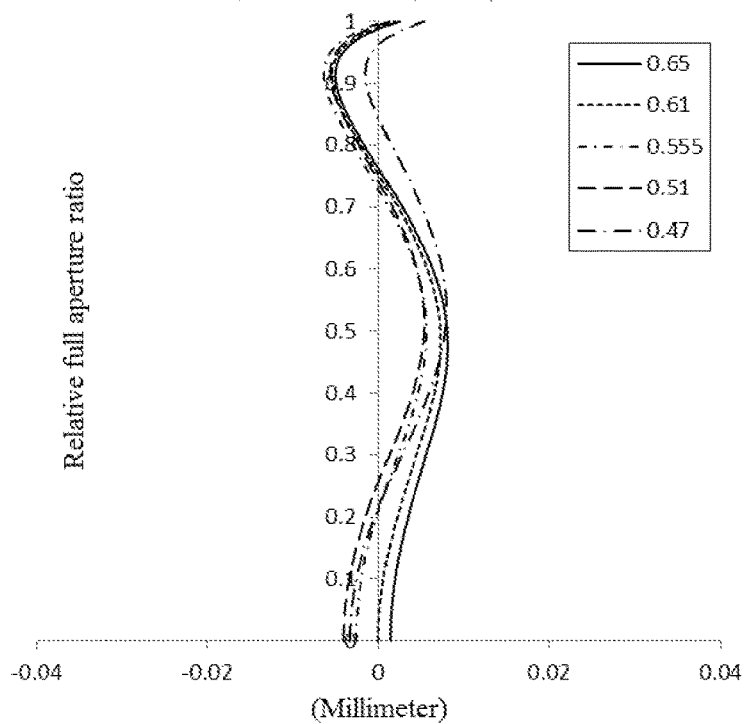
FIG. 38 is a diagram showing a longitudinal aberration curve (mm) of the wide angle lens in embodiment 10.
Figure 39:
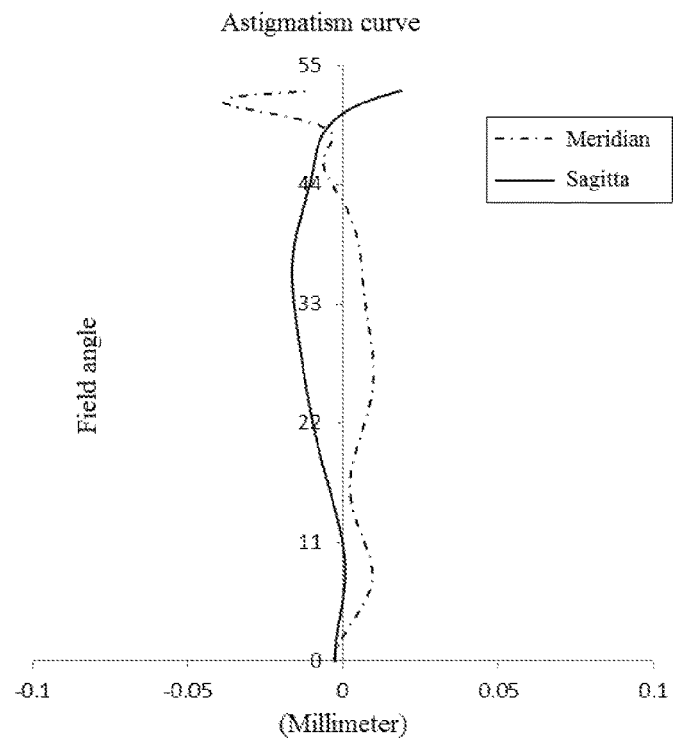
FIG. 39 is a diagram showing an astigmatism curve (mm) of the wide angle lens in embodiment 10.
Figure 40:
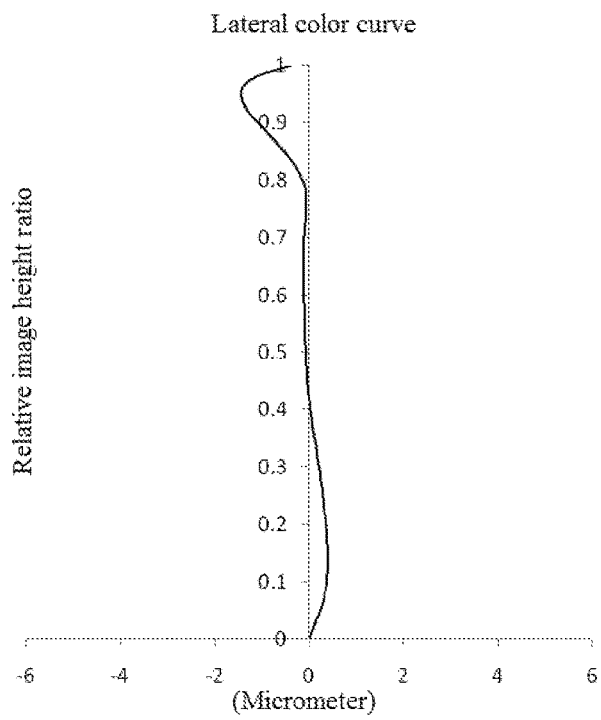
FIG. 40 is a diagram showing a lateral color curve (μm) of the wide angle lens in embodiment 10.
Figure 41:
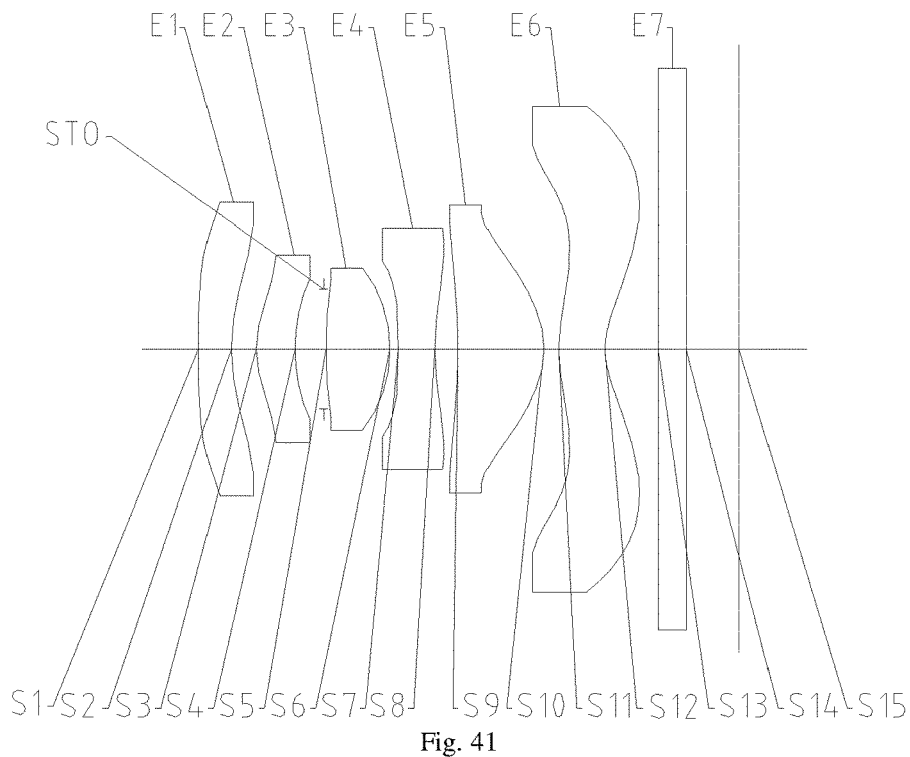
FIG. 41 is a schematic view of a wide angle lens according to embodiment 11.
Figure 42:
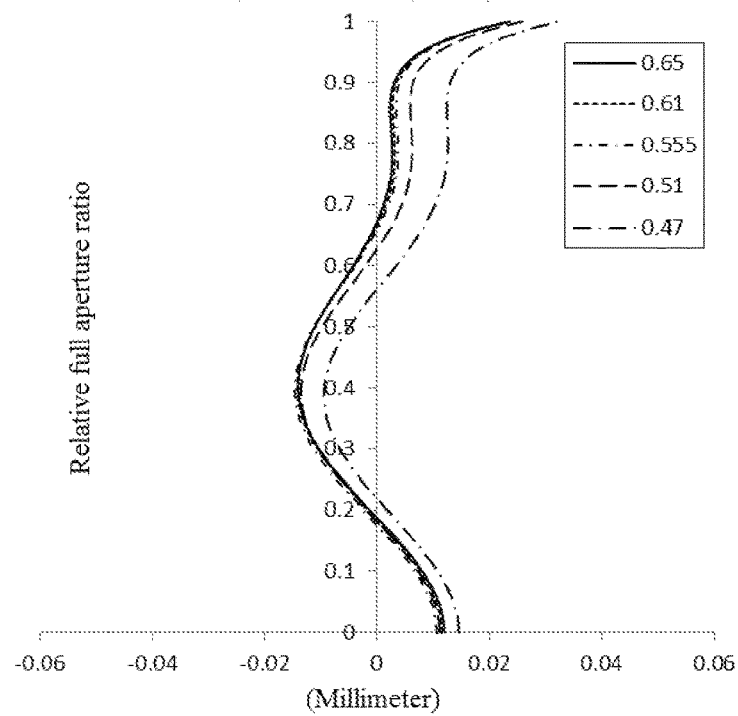
FIG. 42 is a diagram showing a longitudinal aberration curve (mm) of the wide angle lens in embodiment 11.
Figure 43:
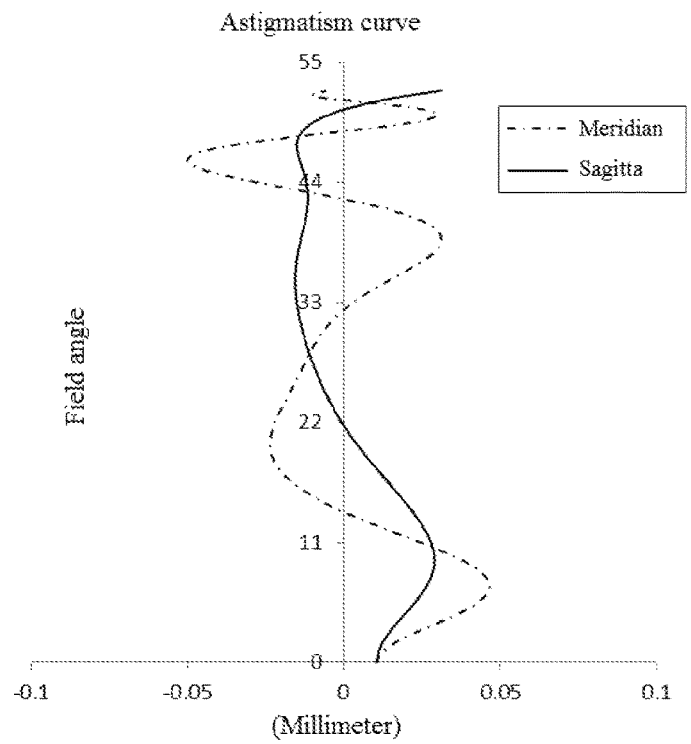
FIG. 43 is a diagram showing an astigmatism curve (mm) of the wide angle lens in embodiment 11.
Figure 44:
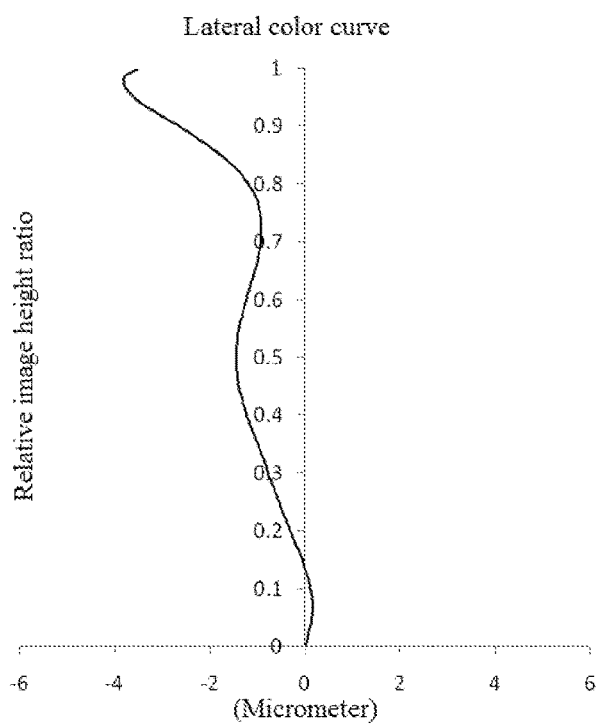
FIG. 44 is a diagram showing a lateral color curve (μm) of the wide angle lens in embodiment 11.
Figure 45:
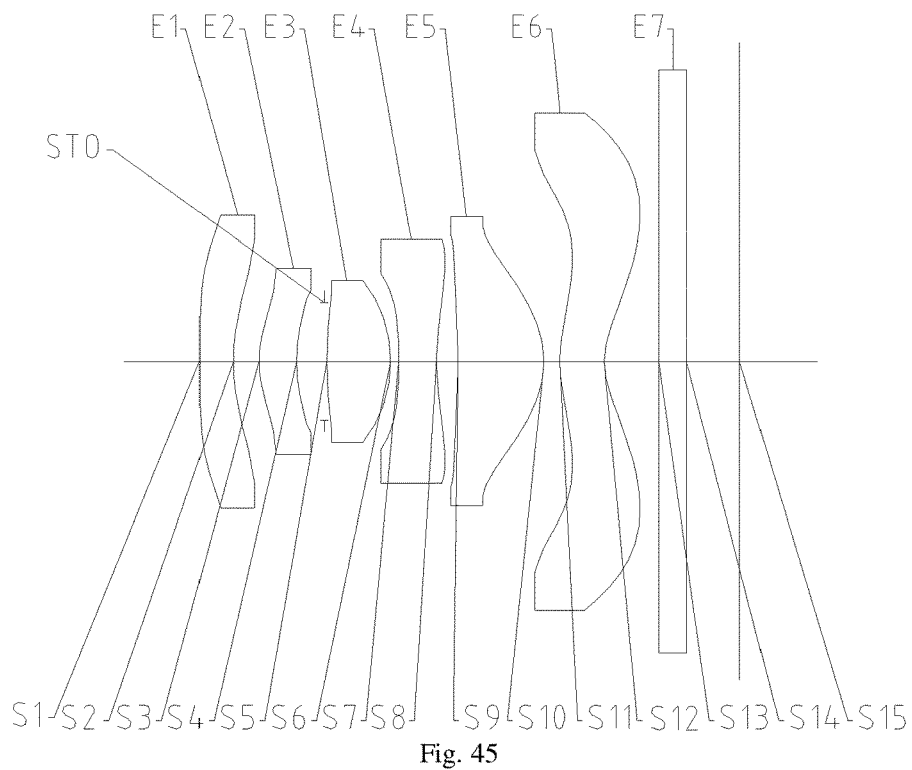
FIG. 45 is a schematic view of a wide angle lens according to embodiment 12.
Figure 46:
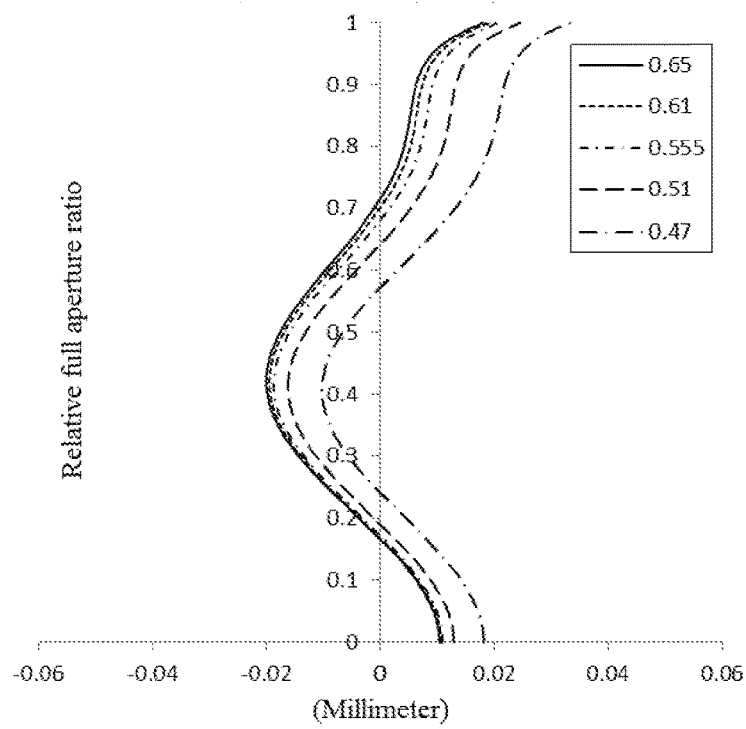
FIG. 46 is a diagram showing a longitudinal aberration curve (mm) of the wide angle lens in embodiment 12.
Figure 47:
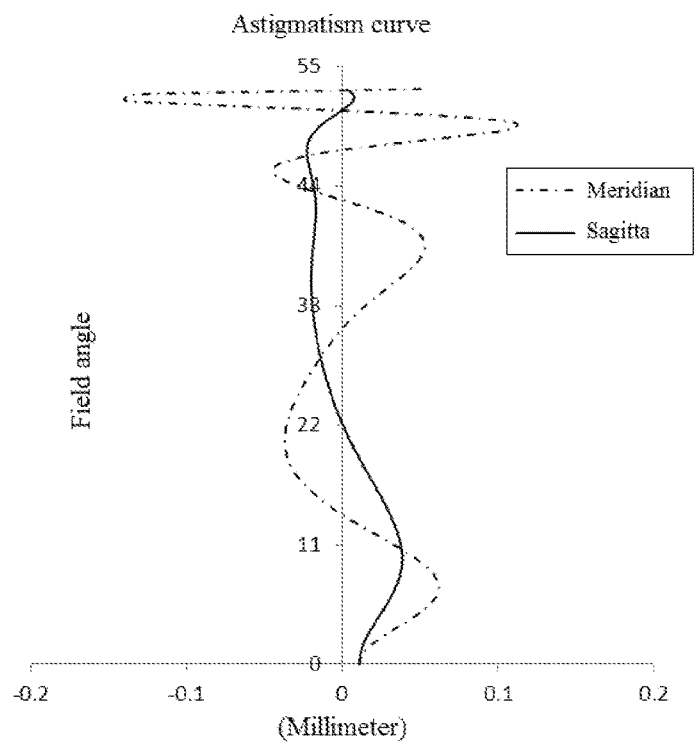
FIG. 47 is a diagram showing an astigmatism curve (mm) of the wide angle lens in embodiment 12.
Figure 48:
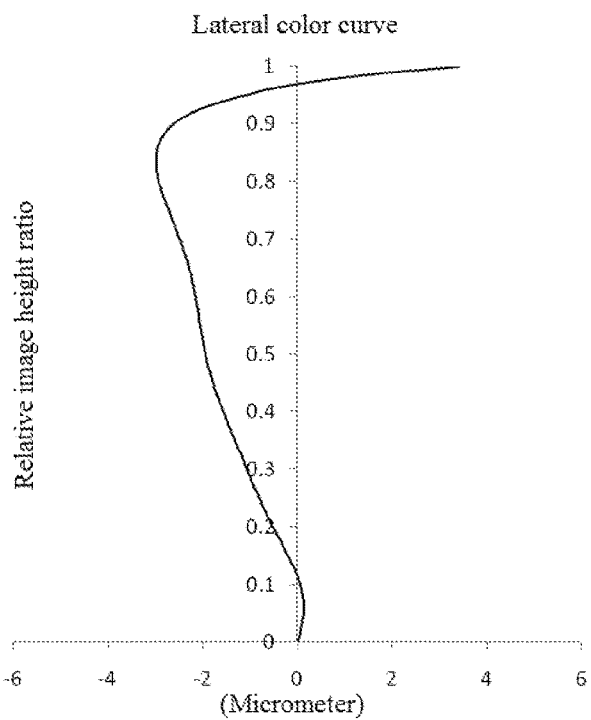
FIG. 48 is a diagram showing a lateral color curve (μm) of the wide angle lens in embodiment 12.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Referring to FIG. 1, a wide angle lens according to embodiments of the present disclosure includes a first lens E1 having a negative refractive power, a second lens E2 having a positive refractive power, a third lens E3 having a positive refractive power, a fourth lens E4 having a negative refractive power, a fifth lens E5 having a positive refractive power and a sixth lens E6 having a negative refractive power in sequence from an object side to an image side.

The first lens E1 has an object-side surface S1 and an image-side surface S2, and the image-side surface S2 is a concave surface. The second lens E2 has an object-side surface S3 and an image-side surface S4. The third lens E3 has an object-side surface S5 and an image-side surface S6, and the object-side surface S5 is a convex surface, the image-side surface S6 is a convex surface. The fourth lens E4 has an object-side surface S7 and an image-side surface S8. The fifth lens E5 has an object-side surface S9 and an image-side surface S10, and the image-side surface S10 is a convex surface. The sixth lens E6 has an object-side surface S11 and an image-side surface S12, and the image-side surface S12 is a concave surface in a paraxial region.

In some embodiments, the wide angle lens further includes an aperture stop STO disposed between the first lens E1 and the second lens E2 or between the second lens E2 and the third lens E3.

During imaging, light rays emitted from or reflected by an object OBJ enter the wide angle lens from the first lens E1 and pass through an optical filter E7 having an object-side surface S13 and an image-side surface S14, and finally form an image on an imaging surface S15.

In some embodiments, the wide angle lens satisfies a conditional expression:

$$1.0 \leq f2/f \leq 2.0,$$

$$0.5 \leq f1/f4 \leq 1.5,$$

in which, f1 denotes an effective focal length of the first lens E1, f2 denotes an effective focal length of the second lens E2, f4 denotes an effective focal length of the fourth lens E4, and f denotes an effective focal length of the wide angle lens.

If the focal length of the second lens E2 is too large, a field curvature of the wide angle lens increases, too, which goes against correction of aberration. If the focal length of the second lens E2 is too small, enlargement of a field angle of the wide angle lens is adverse. Satisfying the above conditional expression to achieve a reasonable allocation of the refractive powers with respect to the first lens E1, the second lens E2 and the fourth lens E4, can effectively correct respective aberrations and improve an imaging quality, while allowing the wide angle lens to have a small dimension and enlarging the filed angle.

In some embodiments, the wide angle lens satisfies a conditional expression:

$$-1.6 \leq f2/f6 < -0.7,$$

in which, f2 denotes the effective focal length of the second lens E2, and f6 denotes an effective focal length of the sixth lens E6.

If an absolute value of the above ratio is too large, manufacturability of the sixth lens E6 is not good, and if the absolute value of the above ratio is too small, manufacturability of the second lens E2 is not good. Satisfying the above conditional expression can effectively balance the manufacturability of the second lens E2 and the sixth lens E6.

In some embodiments, the wide angle lens satisfies a conditional expression:

$$0.8 < Dr5r8/CT5 < 1.5,$$

in which, Dr5r8 denotes an axial distance between the object-side surface S5 of the third surface E3 and the image-side surface S8 of the fourth lens E4, and CT5 denotes a center thickness of the fifth lens E5.

If the ratio is too large, correction of the aberration is adverse, and if the ratio is too small, manufacturability is adverse. Satisfying the above conditional expression can effectively give consideration to both the image quality and the manufacturability.

In some embodiments, the wide angle lens satisfies a conditional expression:

$$0.5 < DT11/DT62 < 0.9,$$

in which, DT11 denotes a maximum effective radius of the object-side surface S1 of the first lens E1, and DT62 denotes a maximum effective radius of the image-side surface S12 of the sixth lens E6.

If the ratio is too large, assemblage process is adverse, and if the ratio is too small, correction of an off-axis aberration is adverse. Satisfying the above conditional expression can effectively give consideration to both image quality and the assemblage process.

In some embodiments, the wide angle lens satisfies a conditional expression:

$$0<CT6/CT5\leq0.6,$$

in which, CT5 denotes a center thickness of the fifth lens E5, and CT6 denotes a center thickness of the sixth lens E6.

The fifth lens E5 is a lens having the positive refractive power, so it needs to ensure an edge thickness of the fifth lens E5. Cooperation of the fifth lens E5 with the sixth lens E6 can effectively eliminate an additional aberration due to the large wide angle. Satisfying the above conditional expression facilitates the miniaturization of the lens and ensures the manufacturability of the sixth lens E6.

In some embodiments, the wide angle lens satisfies a conditional expression:

$$-3<f4/f<-1,$$

in which, f4 denotes the effective focal length of the fourth lens E4, and f denotes the effective focal length of the wide angle lens.

The refractive power of the fourth lens E4 is can be reasonably allocated according to the above conditional expression, the off-axis aberrations produced by the second lens E2 and the third lens E3 can be effectively corrected, aberration can be effectively corrected and the imaging quality can be improved.

In some embodiments, the wide angle lens satisfies a conditional expression:

$$0.8\leq f5/f\leq1.5,$$

in which, f5 denotes an effective focal length of the fifth lens E5, and f denotes the effective focal length of the wide angle lens.

If the refractive power of the fifth lens E5 is too large, the manufacturability is not good, and if the refractive power of the fifth lens E5 is too small, the aberration in an external field can't be effectively corrected. Satisfying the above conditional expression can effectively balance the imaging quality and the manufacturability.

In some embodiments, the wide angle lens satisfies a conditional expression:

$$0<(R5+R6)/(R5-R6)<1,$$

in which, R5 denotes a radius of curvature of the object-side surface S5 of the third lens E3, and R6 denotes a radius of curvature of the image-side surface S6 of the third lens E3.

The curvatures of the object-side surface S5 and the image-side surface S6 of the third lens E3 are reasonably adjusted according to the conditional expression, the refractive power can be more reasonably allocated, thereby reducing an assembly sensitivity of the wide angel lens.

In some embodiments, the wide angle lens satisfies a conditional expression:

$$TTL/\text{ImgH}<2.4,$$

in which, TTL denotes an axial distance between the object-side surface S1 of the first lens E1 and the imaging surface S15, and ImgH denotes a half of a diagonal line of an effective pixel area on the imaging surface S15.

Satisfying the above conditional expression facilitates reduction of a volume of the wide angle lens, thereby achieving the miniaturization of the wide angle lens.

In some embodiments, the image-side surface S4 of the second lens E2 is a convex surface, and the wide angle lens satisfies a conditional expression:

$$0<T23/CT2<0.1,$$

in which, CT2 denotes a center thickness of the second lens E2, and T23 denotes an axial distance between the second lens E2 and the third lens E3.

If the ratio is too large, it is not easy to make the lens thin, and if the ratio is too small, the manufacturability of the second lens E2 is not good. Satisfying the above conditional expression can effectively give consideration to both the miniaturization and manufacturability of the wide angle lens.

In some embodiments, the object-side surface S11 of the sixth lens E6 is a concave surface, and the wide angle lens satisfies a conditional expression:

$$-0.8<SAG61/DT61<-0.4,$$

in which, SAG61 denotes a sagitta of the object-side surface S11 of the sixth lens E6, and DT61 denotes a maximum effective radius of the object-side surface S11 of the sixth lens E6.

If an absolute value of the ratio is too large, the manufacturability is not good, and if the absolute value of the ratio is too small, correction of the off-axis aberration is adverse. Satisfying the above conditional expression can effectively give consideration to both the manufacturability and the whole imaging quality of the wide angle lens.

In some embodiments, the image-side surface S4 of the second lens E2 is a concave surface, and the wide angle lens satisfies a conditional expression:

$$0.5<R3/R4<1.0,$$

in which, R3 denotes a radius of curvature of the object-side surface S3 of the second lens E2; R4 denotes a radius of curvature of the image-side surface S4 of the second lens E2.

If the ratio is too large, correction of a distortion is adverse, and if the ratio is too small, the manufacturability is not good. Satisfying the above conditional expression can effectively give consideration to both the distortion and the manufacturability of the wide angle lens.

In some embodiments, the wide angle lens satisfies a conditional expression:

$$-0.5<(R10+R11)/(R10-R11)<0,$$

in which, R10 denotes a radius of curvature of the image-side surface S10 of the fifth lens E5, and R11 denotes a radius of curvature of the object-side surface S11 of the sixth lens E6.

The curvatures of the image-side surface S10 of the fifth lens E5 and the object-side surface S11 of the sixth lens E6 can be reasonably adjusted according to the conditional expression, which allows the refractive power to achieve a reasonable allocation, thereby reducing an assembly sensitivity of the wide angel lens.

In some embodiments, the first lens E1, the second lens E2, the third lens E3, the fourth lens E4, the fifth lens E5 and the sixth lens E6 each are an aspheric lens. A surface shape of an aspheric surface is defined by a following formula:

$$x = \frac{ch^2}{1 + \sqrt{1-(k+1)c^2h^2}} + \sum A_i h^i,$$

in which, h denotes a height from any point on the aspheric surface to the optical axis, c denotes a curvature of a vertex, k denotes a conic constant, Ai denotes an i-th order correction coefficient of the aspheric surface.

Embodiment 1

Referring to FIG. 1 to FIG. 4, in embodiment 1, the wide angle lens satisfies conditions shown in following tables:

TABLE 1

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 4.6799 | 0.3099 | 1.58/37.0 | 0.0000 |
| S2 | Aspheric Surface | 1.9050 | 0.4627 | | 0.0000 |
| STO | Spherical Surface | Infinite | 0.0248 | | 0.0000 |
| S3 | Aspheric Surface | 14.6507 | 0.5783 | 1.54/56.0 | 0.0000 |
| S4 | Aspheric Surface | −1.8845 | 0.0248 | | 0.0000 |
| S5 | Aspheric Surface | 24.6536 | 0.6466 | 1.54/56.0 | 0.0000 |
| S6 | Aspheric Surface | −4.6842 | 0.0301 | | 0.0000 |
| S7 | Aspheric Surface | 10.7001 | 0.3099 | 1.63/23.9 | 0.0000 |
| S8 | Aspheric Surface | 2.8818 | 0.1913 | | 0.0000 |
| S9 | Aspheric Surface | 5.9332 | 1.0998 | 1.54/56.0 | 0.0000 |
| S10 | Aspheric Surface | −1.7686 | 0.7687 | | 0.0000 |
| S11 | Aspheric Surface | −1.9490 | 0.3099 | 1.62/26.3 | 0.0000 |
| S12 | Aspheric Surface | 3.5164 | 0.0796 | | 0.0000 |
| S13 | Spherical Surface | Infinite | 0.1240 | 1.52/64.2 | |
| S14 | Spherical Surface | Infinite | 0.6198 | | |
| S15 | Spherical Surface | Infinite | | | |

TABLE 2

| Surface Number | A4 | A6 | A8 | A10 | A12 | A14 | A16 |
|---|---|---|---|---|---|---|---|
| S1 | 3.3371E−02 | −2.1396E−02 | −5.1466E−04 | 2.4464E−03 | −1.2006E−03 | 0 | 0 |
| S2 | 1.1725E−01 | 4.7114E−02 | −6.7843E−02 | 1.4327E−01 | 1.1805E−02 | 0 | 0 |
| S3 | −5.3879E−02 | 1.3483E−02 | −7.3434E−02 | 4.1236E−02 | −4.3607E−03 | 0 | 0 |
| S4 | 1.5756E−03 | −5.8696E−02 | 2.4225E−02 | −5.3982E−02 | 7.5695E−03 | 0 | 0 |
| S5 | 4.3083E−02 | −1.6292E−03 | −1.0544E−02 | −2.4516E−03 | −6.5072E−04 | 0 | 0 |
| S6 | −6.5104E−02 | 4.9706E−03 | 7.2829E−03 | −7.5353E−03 | −9.2358E−04 | 0 | 0 |
| S7 | −5.1545E−02 | −1.5274E−02 | −1.8506E−03 | 2.0758E−03 | 1.3022E−03 | 0 | 0 |
| S8 | −3.0656E−02 | 2.8847E−03 | 1.8012E−03 | 1.4567E−04 | 1.0732E−04 | 0 | 0 |
| S9 | −2.4187E−02 | 5.0248E−03 | 1.5640E−03 | 9.6475E−05 | −3.0798E−04 | 0 | 0 |
| S10 | 4.5729E−02 | −1.5185E−02 | 2.6458E−03 | 5.6513E−04 | 3.1301E−04 | 0 | 0 |
| S11 | −8.5189E−02 | 9.0302E−03 | 8.4879E−04 | −3.6016E−04 | 5.1369E−04 | 0 | 0 |
| S12 | −1.2640E−01 | 5.0534E−02 | −1.9194E−02 | 4.9915E−03 | −8.2725E−04 | 8.0479E−05 | −3.4576E−06 |

TABLE 3

| | |
|---|---|
| HFOV(deg) | 60.0 |
| f(mm) | 3.00 |
| f1(mm) | −5.79 |
| f2(mm) | 3.09 |
| f3(mm) | 7.26 |
| f4(mm) | −6.26 |

TABLE 3-continued

| | |
|---|---|
| f5(mm) | 2.63 |
| f6(mm) | −1.97 |

Embodiment 2

Referring to FIG. 5 to FIG. 8, in embodiment 2, the wide angle lens satisfies conditions shown in following tables:

TABLE 4

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 3.7792 | 0.3000 | 1.534/55.77 | 0.0000 |
| S2 | Aspheric Surface | 1.0161 | 1.1057 | | 0.0000 |
| STO | Spherical Surface | Infinite | 0.0550 | | 0.0000 |
| S3 | Aspheric Surface | 113.2463 | 0.7102 | 1.544/56.11 | 0.0000 |
| S4 | Aspheric Surface | −1.4696 | 0.0500 | | 0.0000 |
| S5 | Aspheric Surface | 4.7223 | 0.8884 | 1.534/55.77 | 0.0000 |
| S6 | Aspheric Surface | −1.9493 | 0.0583 | | 0.0000 |
| S7 | Aspheric Surface | −1.8394 | 0.3000 | 1.640/23.53 | 0.0000 |
| S8 | Aspheric Surface | 9.7761 | 0.2408 | | 0.0000 |
| S9 | Aspheric Surface | 2.6343 | 1.0284 | 1.534/55.77 | 0.0000 |
| S10 | Aspheric Surface | −2.9803 | 0.4840 | | 0.0000 |
| S11 | Aspheric Surface | −14.2578 | 0.4000 | 1.640/23.53 | 0.0000 |
| S12 | Aspheric Surface | 2.8568 | 0.1692 | | 0.0000 |
| S13 | Spherical Surface | Infinite | 0.2100 | 1.517/64.17 | |
| S14 | Spherical Surface | Infinite | 0.5000 | | |
| S15 | Spherical Surface | Infinite | | | |

TABLE 5

| Surface Number | A4 | A6 | A8 | A10 | A12 | A14 | A16 |
|---|---|---|---|---|---|---|---|
| S1 | 8.3752E−02 | −7.1685E−02 | 3.3108E−02 | −8.5850E−03 | 3.4089E−04 | 3.2076E−04 | −5.2599E−05 |
| S2 | 9.4671E−02 | 4.0582E−01 | −2.4040E+00 | 7.3196E+00 | −1.2528E+01 | 1.1436E+01 | −4.3854E+00 |
| S3 | −1.5602E−01 | 2.2699E−01 | −3.3850E+00 | 1.7281E+01 | −5.2210E+01 | 8.0494E+01 | −5.0685E+01 |
| S4 | −1.1678E−01 | 3.0805E−02 | −2.3973E−01 | 7.9023E−01 | −1.9578E+00 | 2.1906E+00 | −9.7981E−01 |
| S5 | −5.4394E−02 | 1.1025E−01 | −1.3782E−01 | 1.1578E−01 | −7.3782E−02 | 3.4447E−02 | −5.9375E−03 |
| S6 | −7.6761E−03 | −3.8088E−01 | 1.3376E+00 | −2.2851E+00 | 2.0427E+00 | −9.2804E−01 | 1.7225E−01 |
| S7 | 7.7581E−02 | −2.9450E−01 | 9.4973E−01 | −1.6669E+00 | 1.4538E+00 | −6.0764E−01 | 9.7867E−02 |
| S8 | −1.5313E−02 | 1.7680E−01 | −2.7113E−01 | 2.2051E−01 | −1.0564E−01 | 2.8681E−02 | −3.4182E−03 |
| S9 | −1.6347E−01 | 1.5733E−01 | −1.3864E−01 | 7.9499E−02 | −2.6972E−02 | 4.8835E−03 | −3.5584E−04 |
| S10 | −3.4341E−02 | 1.4967E−02 | −4.4953E−03 | −4.5203E−03 | 5.2492E−03 | −1.7753E−03 | 2.1584E−04 |
| S11 | −1.2106E−01 | 2.6075E−02 | −5.1517E−02 | 5.4278E−02 | −2.3289E−02 | 4.5421E−03 | −3.3376E−04 |
| S12 | −6.5744E−02 | −1.2631E−02 | 9.4584E−03 | −1.8945E−03 | 1.1231E−04 | 7.5911E−06 | −9.0687E−07 |

TABLE 6

| | |
|---|---|
| HFOV(deg) | 82.44 |
| f(mm) | 1.98 |
| f1(mm) | −2.69 |
| f2(mm) | 2.66 |
| f3(mm) | 2.70 |
| f4(mm) | −2.38 |

TABLE 6-continued

| | |
|---|---|
| f5(mm) | 2.79 |
| f6(mm) | −3.66 |

Embodiment 3

Referring to FIG. 9 to FIG. 12, in embodiment 3, the wide angle lens satisfies conditions shown in following tables:

TABLE 7

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 8.7087 | 0.3000 | 1.535/55.78 | 0.0000 |
| S2 | Aspheric Surface | 1.2242 | 1.3420 | | 0.0000 |
| STO | Spherical Surface | Infinite | 0.0027 | | 0.0000 |
| S3 | Aspheric Surface | 3.0663 | 0.6730 | 1.535/55.78 | 0.0000 |
| S4 | Aspheric Surface | −4.1544 | 0.0371 | | 0.0000 |
| S5 | Aspheric Surface | 5.9726 | 0.7437 | 1.535/55.78 | 0.0000 |
| S6 | Aspheric Surface | −3.5365 | 0.0425 | | 0.0000 |
| S7 | Aspheric Surface | −1.9907 | 0.3000 | 1.640/23.53 | 0.0000 |
| S8 | Aspheric Surface | −5.7090 | 0.0299 | | 0.0000 |
| S9 | Aspheric Surface | 1.8259 | 1.1954 | 1.535/55.78 | 0.0000 |
| S10 | Aspheric Surface | −2.9465 | 0.3076 | | 0.0000 |
| S11 | Aspheric Surface | −20.6381 | 0.3000 | 1.640/23.53 | 0.0000 |
| S12 | Aspheric Surface | 2.4907 | 0.4961 | | 0.0000 |
| S13 | Spherical Surface | Infinite | 0.2100 | 1.517/64.17 | |
| S14 | Spherical Surface | Infinite | 0.5000 | | |
| S15 | Spherical Surface | Infinite | | | |

TABLE 8

| Surface Number | A4 | A6 | A8 | A10 | A12 | A14 | A16 |
|---|---|---|---|---|---|---|---|
| S1 | 9.6238E−02 | −4.0918E−02 | 7.2067E−03 | −4.3883E−04 | −3.1591E−07 | −4.5645E−06 | 0 |
| S2 | 1.0467E−01 | 1.1287E−01 | −1.4661E−01 | 1.1465E−01 | −8.3571E−02 | 0 | 0 |
| S3 | −1.2941E−01 | −1.5120E−01 | −1.8960E−01 | 4.2867E−01 | −1.7470E+00 | 0 | 0 |
| S4 | −2.9871E−01 | −2.0863E−01 | 1.8326E−01 | −1.7363E−02 | −1.9122E−01 | 0 | 0 |
| S5 | −1.6680E−01 | −2.1288E−01 | 1.4876E−02 | 2.4188E−02 | −1.7202E−03 | −3.8270E−21 | 0 |
| S6 | −3.7699E−01 | 9.2644E−02 | 3.3485E−02 | −2.7027E−02 | −2.0030E−03 | 1.5580E−21 | 0 |
| S7 | −1.3864E−01 | −1.5975E−02 | 3.9036E−02 | 1.2951E−02 | 3.6477E−04 | 3.7043E−20 | 0 |
| S8 | 7.1191E−02 | −2.2383E−02 | 6.9167E−03 | 7.6853E−03 | −1.1887E−03 | −1.3950E−05 | 0 |
| S9 | −1.7068E−01 | 8.0118E−02 | −4.9450E−02 | 1.4421E−02 | −2.6810E−03 | 8.8517E−04 | −3.0812E−04 |
| S10 | 1.9189E−01 | −1.9526E−01 | 8.1078E−02 | −1.7243E−02 | 7.0894E−04 | 1.7910E−04 | −2.3159E−22 |
| S11 | 1.0024E−01 | −1.5269E−01 | −5.2058E−02 | 7.0499E−02 | −1.9676E−02 | 1.4855E−03 | 8.2888E−05 |
| S12 | 2.8008E−02 | −1.5908E−01 | 9.8984E−02 | −3.3892E−02 | 6.8180E−03 | −7.4159E−04 | 3.3076E−05 |

TABLE 9

| | |
|---|---|
| HFOV(deg) | 74.36 |
| f(mm) | 1.81 |
| f1(mm) | −2.69 |
| f2(mm) | 3.40 |
| f3(mm) | 1.58 |
| f4(mm) | −2.02 |

TABLE 9-continued

| | |
|---|---|
| f5(mm) | 1.49 |
| f6(mm) | −2.57 |

Embodiment 4

Referring to FIG. 13 to FIG. 16, in embodiment 4, the wide angle lens satisfies conditions shown in following tables:

TABLE 10

| Surface Number | Surface Type | Radius of Curvature | Thickness | Material | Conic Coefficient |
|---|---|---|---|---|---|
| OBJ | Spherical Surface | Infinite | 1000.0000 | | |
| S1 | Aspheric Surface | 3.8405 | 0.3272 | 1.544/56.11 | 0.0000 |
| S2 | Aspheric Surface | 1.0201 | 0.9821 | | 0.0000 |
| STO | Spherical Surface | Infinite | 0.0974 | | 0.0000 |
| S3 | Aspheric Surface | 9.2347 | 0.7178 | 1.544/56.11 | 0.0000 |
| S4 | Aspheric Surface | −1.2936 | 0.0300 | | 0.0000 |
| S5 | Aspheric Surface | 16.8454 | 0.7074 | 1.544/56.11 | 0.0000 |
| S6 | Aspheric Surface | −2.9943 | 0.0659 | | 0.0000 |
| S7 | Aspheric Surface | −3.1815 | 0.3073 | 1.640/23.53 | 0.0000 |
| S8 | Aspheric Surface | 4.6993 | 0.2493 | | 0.0000 |
| S9 | Aspheric Surface | 2.7593 | 1.1856 | 1.544/56.11 | 0.0000 |
| S10 | Aspheric Surface | −1.9235 | 0.2364 | | 0.0000 |
| S11 | Aspheric Surface | −7.6373 | 0.3212 | 1.640/23.53 | 0.0000 |
| S12 | Aspheric Surface | 2.5005 | 0.5275 | | 0.0000 |
| S13 | Spherical Surface | Infinite | 0.2100 | 1.517/64.17 | |
| S14 | Spherical Surface | Infinite | 0.5000 | | |
| S15 | Spherical Surface | Infinite | | | |

TABLE 11

| Surface Number | A4 | A6 | A8 | A10 | A12 | A14 | A16 |
|---|---|---|---|---|---|---|---|
| S1 | 1.3419E−01 | −1.6482E−01 | 1.0128E−01 | −4.1074E−02 | 1.0488E−02 | −1.4985E−03 | 8.8868E−05 |
| S2 | 2.1631E−01 | −1.1931E−01 | −5.6912E−01 | 1.9377E+00 | −3.5168E+00 | 3.3924E+00 | −1.4448E+00 |
| S3 | −1.3028E−01 | −1.2567E−01 | −2.2387E−01 | −2.0809E−01 | 1.1645E−01 | 8.4734E−01 | −2.9146E+00 |
| S4 | 2.7835E−02 | −4.5925E−01 | 8.7022E−01 | −3.9909E−01 | −1.9232E+00 | 3.2294E+00 | −1.6441E+00 |
| S5 | 4.1355E−02 | −4.4626E−01 | 1.2221E+00 | −1.8397E+00 | 1.5971E+00 | −7.0737E−01 | 1.2531E−01 |
| S6 | 2.6094E−01 | −1.6364E+00 | 3.6608E+00 | −5.0226E+00 | 4.1919E+00 | −1.9466E+00 | 3.9257E−01 |
| S7 | 4.0758E−01 | −1.6068E+00 | 3.4058E+00 | −4.4373E+00 | 3.3345E+00 | −1.3226E+00 | 2.1559E−01 |
| S8 | 1.8292E−02 | −3.5282E−03 | 1.2568E−01 | −2.3505E−01 | 1.7696E−01 | −6.1959E−02 | 8.3919E−03 |
| S9 | −1.8288E−01 | 2.1931E−01 | −2.4444E−01 | 1.7788E−01 | −7.8901E−02 | 1.9675E−02 | −2.1964E−03 |
| S10 | 3.6945E−02 | 1.0280E−01 | −1.7938E−01 | 1.3288E−01 | −5.2359E−02 | 1.0686E−02 | −8.8937E−04 |
| S11 | −1.2956E−01 | 1.6984E−01 | −3.0406E−01 | 2.5048E−01 | −1.0224E−01 | 2.0550E−02 | −1.6270E−03 |
| S12 | −9.2856E−02 | −1.6368E−02 | 1.4160E−02 | −2.6916E−03 | −1.8652E−05 | 5.6883E−05 | −4.8642E−06 |

TABLE 12

| | |
|---|---|
| HFOV(deg) | 83.2 |
| f(mm) | 2.11 |
| f1(mm) | −2.65 |
| f2(mm) | 2.13 |
| f3(mm) | 4.72 |
| f4(mm) | −2.90 |
| f5(mm) | 2.28 |
| f6(mm) | −2.89 |

Embodiment 5

Referring to FIG. 17 to FIG. 20, in embodiment 5, the wide angle lens satisfies conditions shown in following tables:

TABLE 13

| Surface Number | Surface Type | Radius of Curvature | Thickness | Material | Conic Coefficient |
|---|---|---|---|---|---|
| OBJ | Spherical Surface | Infinite | 1000.0000 | | |
| S1 | Aspheric Surface | 3.7812 | 0.3151 | 1.544/56.11 | 0.0000 |
| S2 | Aspheric Surface | 1.0302 | 0.9814 | | 0.0000 |
| STO | Spherical Surface | Infinite | 0.0547 | | 0.0000 |
| S3 | Aspheric Surface | 30.4854 | 0.6906 | 1.544/56.11 | 0.0000 |
| S4 | Aspheric Surface | −1.5845 | 0.0300 | | 0.0000 |
| S5 | Aspheric Surface | 4.4865 | 0.7972 | 1.544/56.11 | 0.0000 |
| S6 | Aspheric Surface | −2.8981 | 0.0583 | | 0.0000 |
| S7 | Aspheric Surface | −3.2172 | 0.3000 | 1.640/23.53 | 0.0000 |
| S8 | Aspheric Surface | 5.8497 | 0.2251 | | 0.0000 |
| S9 | Aspheric Surface | 2.9441 | 1.3626 | 1.544/56.11 | 0.0000 |
| S10 | Aspheric Surface | −1.8682 | 0.2990 | | 0.0000 |
| S11 | Aspheric Surface | −8.3534 | 0.2130 | 1.640/23.53 | 0.0000 |
| S12 | Aspheric Surface | 2.5277 | 0.4427 | | 0.0000 |
| S13 | Spherical Surface | Infinite | 0.2100 | 1.517/64.17 | |
| S14 | Spherical Surface | Infinite | 0.5000 | | |
| S15 | Spherical Surface | Infinite | | | |

TABLE 14

| Surface Number | A4 | A6 | A8 | A10 | A12 | A14 | A16 |
|---|---|---|---|---|---|---|---|
| S1 | 1.3704E−01 | −1.6507E−01 | 1.0111E−01 | −4.1113E−02 | 1.0481E−02 | −1.4956E−03 | 9.1053E−05 |
| S2 | 2.2513E−01 | −1.1938E−01 | −5.4534E−01 | 1.9472E+00 | −3.5324E+00 | 3.3785E+00 | −1.4132E+00 |
| S3 | −1.0682E−01 | −4.4106E−02 | −1.6465E−01 | −1.7797E−01 | 1.1496E−01 | 1.0166E+00 | −1.6646E+00 |
| S4 | 2.4569E−03 | −4.2796E−01 | 8.9218E−01 | −4.0254E−01 | −1.9369E+00 | 3.2397E+00 | −1.5510E+00 |
| S5 | 3.9322E−02 | −2.7560E−01 | 7.2993E−01 | −1.0230E+00 | 7.7070E−01 | −2.7615E−01 | 3.6814E−02 |
| S6 | 2.7533E−01 | −1.6346E+00 | 3.6607E+00 | −5.0225E+00 | 4.1921E+00 | −1.9469E+00 | 3.9214E−01 |
| S7 | 3.9220E−01 | −1.6073E+00 | 3.4085E+00 | −4.4352E+00 | 3.3358E+00 | −1.3219E+00 | 2.1589E−01 |
| S8 | 2.6324E−02 | −1.6169E−03 | 1.2590E−01 | −2.3520E−01 | 1.7684E−01 | −6.1972E−02 | 8.4414E−03 |
| S9 | −1.8368E−01 | 2.1971E−01 | −2.4403E−01 | 1.7792E−01 | −7.8973E−02 | 1.9649E−02 | −2.1812E−03 |
| S10 | 3.1081E−02 | 1.0299E−01 | −1.7944E−01 | 1.3283E−01 | −5.2387E−02 | 1.0700E−02 | −8.7954E−04 |
| S11 | −1.4467E−01 | 2.1279E−01 | −3.7402E−01 | 2.9460E−01 | −1.1515E−01 | 2.2103E−02 | −1.6612E−03 |
| S12 | −6.8596E−02 | −4.5901E−02 | 2.9652E−02 | −7.0703E−03 | 6.8664E−04 | −7.4596E−06 | −2.1278E−06 |

TABLE 15

| | |
|---|---|
| HFOV(deg) | 85.0 |
| f(mm) | 2.06 |
| f1(mm) | −2.70 |
| f2(mm) | 2.78 |
| f3(mm) | 3.35 |
| f4(mm) | −3.18 |
| f5(mm) | 2.33 |
| f6(mm) | −2.99 |

Embodiment 6

Referring to FIG. 21 to FIG. 24, in embodiment 6, the wide angle lens satisfies conditions shown in following tables:

TABLE 16

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 4.6799 | 0.3099 | 1.57/37.0 | 0.0000 |
| S2 | Aspheric Surface | 1.9050 | 0.4627 | | 0.0000 |
| STO | Spherical Surface | Infinite | 0.0248 | | 0.0000 |
| S3 | Aspheric Surface | 14.6507 | 0.5783 | 1.54/56.0 | 0.0000 |
| S4 | Aspheric Surface | −1.8845 | 0.0248 | | 0.0000 |
| S5 | Aspheric Surface | 24.6536 | 0.6466 | 1.54/56.0 | 0.0000 |
| S6 | Aspheric Surface | −4.6842 | 0.0301 | | 0.0000 |
| S7 | Aspheric Surface | 10.7001 | 0.3099 | 1.64/23.9 | 0.0000 |
| S8 | Aspheric Surface | 2.8818 | 0.1913 | | 0.0000 |
| S9 | Aspheric Surface | 5.9332 | 1.0998 | 1.54/56.0 | 0.0000 |
| S10 | Aspheric Surface | −1.7686 | 0.7687 | | 0.0000 |
| S11 | Aspheric Surface | −1.9490 | 0.3099 | 1.62/26.3 | 0.0000 |
| S12 | Aspheric Surface | 3.5164 | 0.0796 | | 0.0000 |
| S13 | Spherical Surface | Infinite | 0.1240 | 1.517/64.17 | |
| S14 | Spherical Surface | Infinite | 0.6198 | | |
| S15 | Spherical Surface | Infinite | | | |

TABLE 17

| Surface Number | A4 | A6 | A8 | A10 | A12 | A14 | A16 |
|---|---|---|---|---|---|---|---|
| S1 | 3.3371E−02 | −2.1396E−02 | −5.1466E−04 | 2.4464E−03 | −1.2006E−03 | 0 | 0 |
| S2 | 1.1725E−01 | 4.7114E−02 | −6.7843E−02 | 1.4327E−01 | 1.1805E−02 | 0 | 0 |
| S3 | −5.3879E−02 | 1.3483E−02 | −7.3434E−02 | 4.1236E−02 | −4.3607E−03 | 0 | 0 |
| S4 | 1.5756E−03 | −5.8696E−02 | 2.4225E−02 | −5.3982E−02 | 7.5695E−03 | 0 | 0 |
| S5 | 4.3083E−02 | −1.6292E−03 | −1.0544E−02 | −2.4516E−02 | −6.5072E−04 | 0 | 0 |
| S6 | −6.5104E−02 | 4.9706E−03 | 7.2829E−03 | −7.5353E−03 | −9.2358E−04 | 0 | 0 |
| S7 | −5.1545E−02 | −1.5274E−02 | −1.8506E−03 | 2.0758E−03 | 1.3022E−03 | 0 | 0 |
| S8 | −3.0656E−02 | 2.8847E−03 | 1.8012E−03 | 1.4567E−04 | 1.0732E−04 | 0 | 0 |
| S9 | −2.4187E−02 | 5.0248E−03 | 1.5640E−03 | 9.6475E−05 | −3.0798E−04 | 0 | 0 |
| S10 | 4.5729E−02 | −1.5185E−02 | 2.6458E−03 | 5.6513E−04 | 3.1301E−04 | 0 | 0 |
| S11 | −8.5189E−02 | 9.0302E−03 | 8.4879E−04 | −3.6016E−04 | 5.1369E−04 | 0 | 0 |
| S12 | −1.2640E−01 | 5.0534E−02 | −1.9194E−02 | 4.9915E−03 | −8.2725E−04 | 8.0479E−05 | −3.4576E−06 |

TABLE 18

| | |
|---|---|
| HFOV(deg) | 54.9 |
| f(mm) | 2.99 |
| f1(mm) | −5.85 |
| f2(mm) | 3.10 |
| f3(mm) | 7.27 |
| f4(mm) | −6.27 |
| f5(mm) | 2.63 |
| f6(mm) | −1.97 |

Embodiment 7

Referring to FIG. 25 to FIG. 28, in embodiment 7, the wide angle lens satisfies conditions shown in following tables:

TABLE 19

| Surface Number | Surface Type | Radius of Curvature | Thickness | Material | Conic Coefficient |
|---|---|---|---|---|---|
| OBJ | Spherical Surface | Infinite | 600.0000 | | |
| S1 | Aspheric Surface | 529.5950 | 0.2549 | 1.544/56.11 | 0.0000 |
| S2 | Aspheric Surface | 1.6201 | 0.1876 | | −11.4138 |
| S3 | Aspheric Surface | 0.8484 | 0.2908 | 1.544/56.11 | −0.5630 |
| S4 | Aspheric Surface | 1.3348 | 0.2102 | | 3.8689 |
| STO | Spherical Surface | Infinite | 0.0157 | | 0.0000 |
| S5 | Aspheric Surface | 4.0450 | 0.4840 | 1.544/56.11 | −13.4363 |
| S6 | Aspheric Surface | −1.0816 | 0.0595 | | 0.7578 |
| S7 | Aspheric Surface | −8.7682 | 0.2548 | 1.640/23.53 | 18.7730 |
| S8 | Aspheric Surface | 1.8679 | 0.1694 | | −19.0688 |
| S9 | Aspheric Surface | −3.3101 | 0.6544 | 1.544/56.11 | −22.8074 |
| S10 | Aspheric Surface | −0.7123 | 0.1292 | | −1.0085 |
| S11 | Aspheric Surface | 1.1581 | 0.3309 | 1.640/23.53 | −15.4806 |
| S12 | Aspheric Surface | 0.5845 | 0.4286 | | −4.4979 |
| S13 | Spherical Surface | Infinite | 0.2100 | 1.517/64.17 | |
| S14 | Spherical Surface | Infinite | 0.4000 | | |
| S15 | Spherical Surface | Infinite | | | |

TABLE 20

| Surface Number | A4 | A6 | A8 | A10 | A12 | A14 | A16 |
|---|---|---|---|---|---|---|---|
| S1 | 2.1447E−01 | −1.0296E−01 | −8.5210E−02 | 3.0564E−01 | −3.6427E−01 | 1.9670E−01 | −4.0615E−02 |
| S2 | 1.4216E−01 | −1.5779E−01 | 1.1853E−01 | −1.3331E+00 | 2.7687E+00 | −2.1537E+00 | 5.9276E−01 |
| S3 | −5.2757E−01 | −9.9357E−01 | 5.8558E+00 | −4.2076E+01 | 1.3473E+02 | −1.8373E+02 | 9.1189E+01 |
| S4 | −2.0974E−01 | −1.1182E+00 | −1.8304E+00 | 1.0108E+01 | −2.0897E+01 | 7.2091E+01 | 1.3783E+00 |
| S5 | 9.7534E−02 | −1.4358E−01 | −2.1200E−01 | 9.4461E−01 | 5.7054E+00 | 7.9105E+00 | −7.1610E+01 |
| S6 | −1.2618E−02 | 1.7943E−01 | −2.5602E−01 | −2.2669E−01 | −1.6729E+00 | −2.1672E+00 | 2.2218E+01 |
| S7 | −7.1217E−01 | 7.8701E−01 | −2.6781E+00 | 1.6411E+01 | −5.5607E+01 | 8.2331E+01 | −4.4008E+01 |
| S8 | −2.2115E−01 | 2.0343E−01 | −1.7339E−02 | −5.9476E−02 | −9.1356E−02 | −3.7481E−02 | 7.4544E−02 |
| S9 | 1.0008E−01 | −1.1136E−01 | 1.3537E−01 | −5.2723E−02 | −4.5456E−02 | −2.6552E−03 | −6.2099E−03 |
| S10 | 2.3705E−01 | −1.6846E−01 | 8.7190E−02 | 7.2595E−02 | 2.4901E−02 | −5.3569E−03 | −2.6603E−02 |
| S11 | −8.8510E−02 | −2.5161E−01 | 4.9663E−01 | −4.7742E−01 | 2.4482E−01 | −6.2447E−02 | 6.2370E−03 |
| S12 | −2.0042E−01 | 1.3192E−01 | −7.0391E−02 | 2.3639E−02 | −5.2510E−03 | 7.5782E−04 | −5.4210E−05 |

TABLE 21

| | |
|---|---|
| HFOV(deg) | 52.5 |
| f(mm) | 1.87 |
| f1(mm) | -2.98 |
| f2(mm) | 3.52 |
| f3(mm) | 1.62 |
| f4(mm) | -2.37 |
| f5(mm) | 1.53 |
| f6(mm) | -2.37 |

Embodiment 8

Referring to FIG. 29 to FIG. 32, in embodiment 8, the wide angle lens satisfies conditions shown in following tables:

TABLE 22

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | 185.5756 | 0.2364 | 1.544/56.11 | 0.0000 |
| S2 | Aspheric Surface | 1.3463 | 0.1799 | | -11.5392 |
| S3 | Aspheric Surface | 0.7764 | 0.3188 | 1.544/56.11 | -0.5661 |
| S4 | Aspheric Surface | 1.3200 | 0.2269 | | 4.2532 |
| STO | Spherical Surface | Infinite | 0.0190 | | 0.0000 |
| S5 | Aspheric Surface | 4.6250 | 0.4738 | 1.544/56.11 | -17.8463 |
| S6 | Aspheric Surface | -1.1413 | 0.0330 | | 0.8192 |
| S7 | Aspheric Surface | 10.4029 | 0.2250 | 1.640/23.53 | -78.8924 |
| S8 | Aspheric Surface | 1.6936 | 0.2028 | | -10.6008 |
| S9 | Aspheric Surface | -2.5181 | 0.6613 | 1.544/56.11 | -17.7560 |
| S10 | Aspheric Surface | -0.7298 | 0.1559 | | -1.0228 |
| S11 | Aspheric Surface | 1.2382 | 0.3327 | 1.640/23.53 | -15.0968 |
| S12 | Aspheric Surface | 0.6227 | 0.4095 | | -4.6340 |
| S13 | Spherical Surface | Infinite | 0.2100 | 1.517/64.17 | |
| S14 | Spherical Surface | Infinite | 0.4000 | | |
| S15 | Spherical Surface | Infinite | | | |

TABLE 23

| Surface Number | A4 | A6 | A8 | A10 | A12 | A14 | A16 |
|---|---|---|---|---|---|---|---|
| S1 | 2.0331E-01 | -8.5368E-02 | -8.9769E-02 | 2.2281E-01 | -2.2440E-01 | 1.1190E-01 | -2.2410E-02 |
| S2 | 1.4044E-01 | 6.2654E-02 | -1.3665E+00 | 2.5149E+00 | -2.0501E+00 | 8.0873E-01 | -1.2815E-01 |
| S3 | -6.5686E-01 | 4.4768E-01 | -2.8320E+00 | -4.3548E+00 | 4.0558E+01 | -6.6396E+01 | 3.4231E+01 |
| S4 | -1.3446E-01 | -8.3128E-01 | -1.7718E+00 | 9.7147E+00 | -2.1013E+01 | 6.8535E+01 | -6.3632E+01 |
| S5 | 9.6165E-02 | -1.0524E-01 | -1.6261E-02 | 1.3343E+00 | 5.7006E+00 | 4.3646E+00 | -7.9460E+01 |
| S6 | -8.9836E-02 | 1.5483E-01 | -2.2882E-01 | -3.2512E-01 | -2.0856E+00 | -2.7246E+00 | 2.2891E+01 |
| S7 | -7.2261E-01 | 1.3760E+00 | -7.0684E+00 | 3.0002E+01 | -7.8785E+01 | 1.0414E+02 | -5.7152E+01 |
| S8 | -2.0251E-01 | 2.0032E-01 | -1.5950E-02 | -5.5876E-02 | -9.0324E-02 | -4.1130E-02 | 8.2136E-02 |
| S9 | 1.1468E-01 | -8.9578E-02 | 1.5802E-01 | -4.6991E-02 | -5.5401E-02 | -1.0752E-02 | -2.4172E-03 |
| S10 | 2.4004E-01 | -1.7454E-01 | 8.3307E-02 | 7.0364E-02 | 2.4036E-02 | -5.3319E-03 | -2.6145E-02 |
| S11 | -1.3326E-01 | -8.2867E-02 | 2.0117E-01 | -1.9301E-01 | 9.6817E-02 | -2.3504E-02 | 2.1707E-03 |
| S12 | -1.9943E-01 | 1.3178E-01 | -7.0279E-02 | 2.3686E-02 | -5.2466E-03 | 7.5714E-04 | -5.4397E-05 |

TABLE 24

| | |
|---|---|
| HFOV(deg) | 50.0 |
| f(mm) | 1.87 |
| f1(mm) | -2.49 |
| f2(mm) | 2.86 |
| f3(mm) | 1.73 |
| f4(mm) | -3.17 |
| f5(mm) | 1.67 |
| f6(mm) | -2.47 |

Embodiment 9

Referring to FIG. 33 to FIG. 36, in embodiment 9, the wide angle lens satisfies conditions shown in following tables:

TABLE 25

| Surface Number | Surface Type | Radius of Curvature | Thickness | Material | Conic Coefficient |
|---|---|---|---|---|---|
| OBJ | Spherical Surface | Infinite | 600.0000 | | |
| S1 | Aspheric Surface | −20.6009 | 0.2323 | 1.544/56.11 | 0.0000 |
| S2 | Aspheric Surface | 1.3360 | 0.1806 | | −11.3007 |
| S3 | Aspheric Surface | 0.7661 | 0.3146 | 1.544/56.11 | −0.6173 |
| S4 | Aspheric Surface | 1.4114 | 0.2335 | | 4.2296 |
| STO | Spherical Surface | Infinite | 0.0136 | | 0.0000 |
| S5 | Aspheric Surface | 4.3427 | 0.4823 | 1.544/56.11 | −3.0585 |
| S6 | Aspheric Surface | −1.2242 | 0.0330 | | 0.9040 |
| S7 | Aspheric Surface | 3.8010 | 0.2250 | 1.640/23.53 | −61.6904 |
| S8 | Aspheric Surface | 1.5366 | 0.2301 | | −8.4374 |
| S9 | Aspheric Surface | −2.0902 | 0.6300 | 1.544/56.11 | −9.5034 |
| S10 | Aspheric Surface | −0.7274 | 0.1117 | | −1.0296 |
| S11 | Aspheric Surface | 1.3835 | 0.3579 | 1.640/23.53 | −17.6267 |
| S12 | Aspheric Surface | 0.6676 | 0.3815 | | −4.8537 |
| S13 | Spherical Surface | Infinite | 0.2100 | 1.517/64.17 | |
| S14 | Spherical Surface | Infinite | 0.4000 | | |
| S15 | Spherical Surface | Infinite | | | |

TABLE 26

| Surface Number | A4 | A6 | A8 | A10 | A12 | A14 | A16 |
|---|---|---|---|---|---|---|---|
| S1 | 2.1999E−01 | −1.2679E−01 | −4.8597E−02 | 2.1798E−01 | −2.4486E−01 | 1.2662E−01 | −2.5674E−02 |
| S2 | 1.6815E−01 | −2.1910E−01 | −2.9993E−01 | 4.8704E−01 | 2.3928E−02 | −2.8554E−01 | 1.0469E−01 |
| S3 | −6.5411E−01 | 2.1884E−01 | −2.0147E+00 | −6.6645E+00 | 4.3550E+01 | −6.7019E+01 | 3.3142E+01 |
| S4 | −9.9271E−02 | −9.2600E−01 | −1.5191E+00 | 1.0450E+01 | −2.1905E+01 | 6.1975E+01 | −4.9054E+01 |
| S5 | 1.1127E−01 | −7.4687E−02 | 1.0475E−03 | 1.4368E+00 | 6.2489E+00 | 3.7647E+00 | −1.0645E+02 |
| S6 | −1.0709E−01 | 2.0682E−01 | −9.6508E−02 | −6.2922E−02 | −1.7753E+00 | −3.1306E+00 | 1.8988E+01 |
| S7 | −6.9803E−01 | 2.1034E+00 | −1.1460E+01 | 3.9877E+01 | −7.7571E+01 | 6.5339E+01 | −1.3686E+01 |
| S8 | −2.0876E−01 | 1.9038E−01 | −1.3740E−02 | −4.2129E−02 | −7.8321E−02 | −4.0273E−02 | 6.5950E−02 |
| S9 | 1.1608E−01 | −7.7974E−02 | 1.6977E−01 | −3.8384E−02 | −5.1355E−02 | −1.2562E−02 | −7.5386E−03 |
| S10 | 2.4287E−01 | −1.7135E−01 | 8.4548E−02 | 7.0924E−02 | 2.4259E−02 | −5.1448E−03 | −2.5767E−02 |
| S11 | −1.2422E−01 | −2.0094E−01 | 4.3291E−01 | −4.4411E−01 | 2.4327E−01 | −6.5570E−02 | 6.8464E−03 |
| S12 | −2.0730E−01 | 1.3166E−01 | −7.0403E−02 | 2.3640E−02 | −5.2498E−03 | 7.5827E−04 | −5.4067E−05 |

TABLE 27

| | |
|---|---|
| HFOV(deg) | 53.5 |
| f(mm) | 1.83 |
| f1(mm) | −2.29 |
| f2(mm) | 2.62 |
| f3(mm) | 1.80 |
| f4(mm) | −4.16 |

TABLE 27-continued

| | |
|---|---|
| f5(mm) | 1.76 |
| f6(mm) | −2.49 |

Embodiment 10

Referring to FIG. 37 to FIG. 40, in embodiment 10, the wide angle lens satisfies conditions shown in following tables:

TABLE 28

| Surface Number | Surface Type | Radius of Curvature | Thickness | Material | Conic Coefficient |
|---|---|---|---|---|---|
| OBJ | Spherical Surface | Infinite | 600.0000 | | |
| S1 | Aspheric Surface | −327.3598 | 0.2320 | 1.544/56.11 | 0.0000 |
| S2 | Aspheric Surface | 1.3776 | 0.1852 | | −11.0934 |
| S3 | Aspheric Surface | 0.7821 | 0.3090 | 1.544/56.11 | −0.5825 |
| S4 | Aspheric Surface | 1.3246 | 0.2327 | | 4.0977 |
| STO | Spherical Surface | Infinite | 0.0155 | | 0.0000 |
| S5 | Aspheric Surface | 4.5017 | 0.4786 | 1.544/56.11 | −8.1072 |
| S6 | Aspheric Surface | −1.1391 | 0.0330 | | 0.7441 |
| S7 | Aspheric Surface | 7.3628 | 0.2250 | 1.640/23.53 | −99.9900 |
| S8 | Aspheric Surface | 1.6000 | 0.2083 | | −10.2918 |
| S9 | Aspheric Surface | −2.3218 | 0.6634 | 1.544/56.11 | −12.6284 |
| S10 | Aspheric Surface | −0.7201 | 0.1328 | | −1.0074 |
| S11 | Aspheric Surface | 1.3279 | 0.3533 | 1.640/23.53 | −15.9209 |
| S12 | Aspheric Surface | 0.6467 | 0.4013 | | −4.8028 |
| S13 | Spherical Surface | Infinite | 0.2100 | 1.517/64.17 | |
| S14 | Spherical Surface | Infinite | 0.4000 | | |
| S15 | Spherical Surface | Infinite | | | |

TABLE 29

| Surface Number | A4 | A6 | A8 | A10 | A12 | A14 | A16 |
|---|---|---|---|---|---|---|---|
| S1 | 2.1071E−01 | −8.2600E−02 | −1.4441E−01 | 3.5180E−01 | −3.6120E−01 | 1.8049E−01 | −3.5668E−02 |
| S2 | 1.5566E−01 | −1.1330E−01 | −6.1598E−01 | 9.7604E−01 | −4.2072E−01 | −5.6149E−02 | 5.4413E−02 |
| S3 | −6.0064E−01 | −2.9521E−01 | 1.3369E+00 | −1.9465E+01 | 7.2399E+01 | −1.0122E+02 | 4.9512E+01 |
| S4 | −1.4386E−01 | −1.0031E+00 | −1.6308E+00 | 1.0361E+01 | −2.1830E+01 | 6.1883E+01 | −5.4508E+01 |
| S5 | 1.0540E−01 | −9.8744E−02 | −3.7767E−02 | 1.4018E+00 | 6.3680E+00 | 5.4124E+00 | −9.3093E+01 |
| S6 | −5.4769E−02 | 1.6635E−01 | −2.2429E−01 | −2.2841E−01 | −1.8402E+00 | −2.6493E+00 | 2.1028E+01 |
| S7 | −6.7927E−01 | 7.9636E−01 | −1.4922E+00 | −1.0258E+00 | 1.7954E+01 | −5.3642E+01 | 4.7103E+01 |
| S8 | −2.0796E−01 | 1.9607E−01 | −1.1843E−02 | −4.5656E−02 | −8.4529E−02 | −4.5127E−02 | 6.6210E−02 |
| S9 | 1.1585E−01 | −8.3980E−02 | 1.6280E−01 | −4.2558E−02 | −5.2284E−02 | −1.1737E−02 | −6.7427E−03 |
| S10 | 2.3566E−01 | −1.7405E−01 | 8.4513E−02 | 7.1579E−02 | 2.4918E−02 | −4.6235E−03 | −2.5368E−02 |
| S11 | −1.3495E−01 | −9.1496E−02 | 2.3356E−01 | −2.3478E−01 | 1.2225E−01 | −3.0957E−02 | 3.0177E−03 |
| S12 | −1.9661E−01 | 1.3144E−01 | −7.0351E−02 | 2.3675E−02 | −5.2484E−03 | 7.5658E−04 | −5.4649E−05 |

TABLE 30

| | |
|---|---|
| HFOV(deg) | 52.7 |
| f(mm) | 1.87 |
| f1(mm) | −2.51 |
| f2(mm) | 2.91 |
| f3(mm) | 1.72 |
| f4(mm) | −3.22 |
| f5(mm) | 1.67 |
| f6(mm) | −2.45 |

Embodiment 11

Referring to FIG. 41 to FIG. 44, in embodiment 11, the wide angle lens satisfies conditions shown in following tables:

TABLE 31

| Surface Number | Surface Type | Radius of Curvature | Thickness | Material | Conic Coefficient |
|---|---|---|---|---|---|
| OBJ | Spherical Surface | Infinite | 600.0000 | | |
| S1 | Aspheric Surface | −119.2067 | 0.2447 | 1.544/56.11 | 0.0000 |
| S2 | Aspheric Surface | 1.5204 | 0.1885 | | −11.4938 |
| S3 | Aspheric Surface | 0.8312 | 0.2939 | 1.544/56.11 | −0.5678 |
| S4 | Aspheric Surface | 1.3518 | 0.2160 | | 3.9807 |
| STO | Spherical Surface | Infinite | 0.0179 | | 0.0000 |
| S5 | Aspheric Surface | 4.3147 | 0.4831 | 1.544/56.11 | −11.2036 |
| S6 | Aspheric Surface | −1.0888 | 0.0646 | | 0.8007 |
| S7 | Aspheric Surface | −12.5316 | 0.2757 | 1.640/23.53 | 48.9799 |
| S8 | Aspheric Surface | 1.8071 | 0.1771 | | −13.4880 |
| S9 | Aspheric Surface | −3.5124 | 0.6440 | 1.544/56.11 | −12.8747 |
| S10 | Aspheric Surface | −0.7284 | 0.1114 | | −1.0075 |
| S11 | Aspheric Surface | 1.1606 | 0.3502 | 1.640/23.53 | −17.0537 |
| S12 | Aspheric Surface | 0.5883 | 0.4029 | | −4.7236 |
| S13 | Spherical Surface | Infinite | 0.2100 | 1.517/64.17 | |
| S14 | Spherical Surface | Infinite | 0.4000 | | |
| S15 | Spherical Surface | Infinite | | | |

TABLE 32

| Surface Number | A4 | A6 | A8 | A10 | A12 | A14 | A16 |
|---|---|---|---|---|---|---|---|
| S1 | 2.2135E−01 | −1.3331E−01 | 1.1032E−02 | 1.4099E−01 | −2.1574E−01 | 1.3050E−01 | −2.9227E−02 |
| S2 | 1.6035E−01 | −2.6999E−01 | 4.0908E−01 | −1.8187E+00 | 3.3213E+00 | −2.5100E+00 | 6.8580E−01 |
| S3 | −4.5847E−01 | −2.1271E+00 | 1.3632E+01 | −7.1761E+01 | 1.9951E+02 | −2.5809E+02 | 1.2571E+02 |
| S4 | −1.5896E−01 | −1.0653E+00 | −1.7417E+00 | 1.0469E+01 | −1.9331E+01 | 7.7458E+01 | 1.4743E+01 |
| S5 | 1.0182E−01 | −1.0658E−01 | −8.0372E−02 | 1.2749E+00 | 6.1468E+00 | 6.4745E+00 | −8.7194E+01 |
| S6 | −6.0017E−02 | 2.1364E−01 | −1.4516E−01 | −1.3051E−01 | −1.7091E+00 | −2.4386E+00 | 2.1506E+01 |
| S7 | −3.7628E−01 | −3.5529E+00 | 3.0609E+01 | −1.3686E+02 | 3.5296E+02 | −4.9641E+02 | 2.9024E+02 |
| S8 | −2.2462E−01 | 2.0210E−01 | −1.3275E−02 | −5.1455E−02 | −8.8439E−02 | −4.5101E−02 | 6.5649E−02 |
| S9 | 1.0798E−01 | −9.9529E−02 | 1.4154E−01 | −5.3649E−02 | −5.1375E−02 | −7.9249E−03 | −3.8813E−03 |
| S10 | 2.3673E−01 | −1.6968E−01 | 8.6139E−02 | 7.2023E−02 | 2.4871E−02 | −4.9180E−03 | −2.5789E−02 |
| S11 | −8.0696E−02 | −3.2658E−01 | 6.6854E−01 | −6.6572E−01 | 3.4914E−01 | −9.0570E−02 | 9.1780E−03 |
| S12 | −2.0544E−01 | 1.3167E−01 | −7.0410E−02 | 2.3637E−02 | −5.2508E−03 | 7.5797E−04 | −5.4155E−05 |

TABLE 33

| | |
|---|---|
| HFOV(deg) | 52.4 |
| f(mm) | 1.87 |
| f1(mm) | −2.75 |
| f2(mm) | 3.30 |
| f3(mm) | 1.64 |
| f4(mm) | −2.43 |

TABLE 33-continued

| | |
|---|---|
| f5(mm) | 1.56 |
| f6(mm) | −2.44 |

Embodiment 12

Referring to FIG. 45 to FIG. 48, in embodiment 12, the wide angle lens satisfies conditions shown in following tables:

TABLE 34

| Surface Number | Surface Type | Radius of Curvature | Thickness | Material | Conic Coefficient |
|---|---|---|---|---|---|
| OBJ | Spherical Surface | Infinite | 600.0000 | | |
| S1 | Aspheric Surface | −431.1757 | 0.2552 | 1.544/56.11 | 0.0000 |
| S2 | Aspheric Surface | 1.6597 | 0.1943 | | −11.4293 |
| S3 | Aspheric Surface | 0.8808 | 0.2848 | 1.544/56.11 | −0.5580 |
| S4 | Aspheric Surface | 1.3747 | 0.2096 | | 3.8729 |
| STO | Spherical Surface | Infinite | 0.0188 | | 0.0000 |
| S5 | Aspheric Surface | 4.1638 | 0.4823 | 1.544/56.11 | −12.5690 |
| S6 | Aspheric Surface | −1.0407 | 0.0602 | | 0.7071 |
| S7 | Aspheric Surface | −6.5686 | 0.2858 | 1.640/23.53 | −5.9700 |
| S8 | Aspheric Surface | 1.6503 | 0.1663 | | −17.5974 |
| S9 | Aspheric Surface | −4.9056 | 0.6448 | 1.544/56.11 | −16.0039 |
| S10 | Aspheric Surface | −0.7293 | 0.1188 | | −1.0084 |
| S11 | Aspheric Surface | 1.0703 | 0.3364 | 1.640/23.53 | −15.8684 |
| S12 | Aspheric Surface | 0.5697 | 0.4128 | | −4.6910 |
| S13 | Spherical Surface | Infinite | 0.2100 | 1.517/64.17 | |
| S14 | Spherical Surface | Infinite | 0.4000 | | |
| S15 | Spherical Surface | Infinite | | | |

TABLE 35

| Surface Number | A4 | A6 | A8 | A10 | A12 | A14 | A16 |
|---|---|---|---|---|---|---|---|
| S1 | 2.0375E−01 | −6.5837E−02 | −1.3586E−01 | 3.4720E−01 | −3.9694E−01 | 2.1729E−01 | −4.6055E−02 |
| S2 | 1.1447E−01 | 5.5011E−02 | −4.5023E−01 | −6.8703E−01 | 2.5039E+00 | −2.1849E+00 | 6.2658E−01 |
| S3 | −4.3800E−01 | −2.0572E+00 | 1.3075E+01 | −7.2306E+01 | 2.0709E+02 | −2.7212E+02 | 1.3357E+02 |
| S4 | −2.0917E−01 | −1.1106E+00 | −1.7412E+00 | 1.0551E+01 | −1.9440E+01 | 7.4930E+01 | −1.2743E+00 |
| S5 | 9.8628E−02 | −1.4250E−01 | −2.3017E−01 | 8.4881E−01 | 5.4925E+00 | 8.3811E+00 | −6.1817E+01 |
| S6 | −4.7356E−03 | 2.4831E−01 | −1.4163E−01 | −1.3197E−01 | −1.7036E+00 | −2.5215E+00 | 2.0991E+01 |
| S7 | −3.8136E−01 | −4.8645E+00 | 4.3644E+01 | −1.9475E+02 | 4.9221E+02 | −6.6861E+02 | 3.7556E+02 |
| S8 | −2.2498E−01 | 2.0129E−01 | −1.6354E−02 | −5.8268E−02 | −9.6832E−02 | −4.9715E−02 | 6.4345E−02 |
| S9 | 1.0206E−01 | −1.0849E−01 | 1.3558E−01 | −5.5740E−02 | −5.0727E−02 | −7.5337E−03 | −7.8815E−03 |
| S10 | 2.3702E−01 | −1.6868E−01 | 8.7028E−02 | 7.2574E−02 | 2.5035E−02 | −5.1048E−03 | −2.6281E−02 |
| S11 | −5.4864E−02 | −3.5790E−01 | 6.8685E−01 | −6.6394E−01 | 3.4112E−01 | −8.7089E−02 | 8.7065E−03 |
| S12 | −2.0247E−01 | 1.3184E−01 | −7.0398E−02 | 2.3637E−02 | −5.2512E−03 | 7.5779E−04 | −5.4215E−05 |

TABLE 36

| | |
|---|---|
| HFOV(deg) | 52.9 |
| f(mm) | 1.85 |
| f1(mm) | −3.03 |
| f2(mm) | 3.73 |
| f3(mm) | 1.58 |
| f4(mm) | −2.02 |
| f5(mm) | 1.49 |
| f6(mm) | −2.57 |

In embodiments 1-12, each conditional expression satisfies conditions shown in a following table.

| Conditional Expression | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 | Embodiment 11 | Embodiment 12 |
|---|---|---|---|---|---|---|---|---|---|---|---|---|
| f2/f | 1.03 | 1.35 | 1.88 | 1.01 | 1.35 | 1.04 | 1.88 | 1.53 | 1.43 | 1.56 | 1.76 | 2.02 |
| f1/f4 | 0.92 | 1.13 | 0.55 | 0.92 | 0.85 | 0.93 | 1.26 | 0.78 | 0.55 | 0.78 | 1.13 | 1.50 |
| f2/f6 | −1.57 | −0.73 | −0.99 | −0.74 | −0.93 | −1.57 | −1.49 | −1.16 | −1.05 | −1.19 | −1.35 | −1.45 |
| Dr5r8/CT5 | 0.90 | 1.21 | 0.91 | 0.91 | 0.85 | 0.90 | 1.22 | 1.11 | 1.18 | 1.11 | 1.28 | 1.28 |
| DT11/DT62 | 0.53 | 0.64 | 0.85 | 0.69 | 0.70 | 0.65 | 0.60 | 0.66 | 0.61 | 0.59 | 0.60 | 0.59 |
| CT6/CT5 | 0.28 | 0.39 | 0.25 | 0.27 | 0.16 | 0.28 | 0.51 | 0.50 | 0.57 | 0.53 | 0.54 | 0.52 |
| f4/f | −2.09 | −1.20 | −2.71 | −1.37 | −1.54 | −2.10 | −1.26 | −1.70 | −2.27 | −1.73 | −1.30 | −1.09 |
| f5/f | 0.88 | 1.41 | 1.27 | 1.08 | 1.13 | 0.88 | 0.82 | 0.89 | 0.96 | 0.89 | 0.83 | 0.81 |
| (R5 + R6)/(R5 − R6) | 0.68 | 0.42 | 0.26 | 0.70 | 0.22 | 0.68 | 0.58 | 0.60 | 0.56 | 0.60 | 0.60 | 0.60 |
| TTL/ImgH | 1.92 | 2.17 | 2.25 | 2.16 | 2.16 | 2.05 | 1.70 | 1.79 | 1.68 | 1.70 | 1.70 | 1.70 |
| SAG61/DT61 | −0.71 | −0.43 | −0.51 | −0.47 | −0.56 | −0.70 | — | — | — | — | — | — |
| T23/CT2 | 0.04 | 0.07 | 0.06 | 0.04 | 0.04 | 0.04 | — | — | — | — | — | — |
| R3/R4 | — | — | — | — | — | — | 0.64 | 0.59 | 0.54 | 0.59 | 0.61 | 0.64 |
| (R10 + R11)/(R10 − R11) | — | — | — | — | — | — | −0.24 | −0.26 | −0.31 | −0.30 | −0.23 | −0.19 |

As shown in the above tables and FIGS. 1 to 48, the refractive powers of respective lenses of the wide angle lens according to embodiments of the present disclosure are allocated reasonably, curvatures of the surfaces of respective lenses are adjusted, center thicknesses of respective lenses are ensured, thereby allowing the wide angle lens according to embodiments of the present disclosure to have advantages of ultra-wide angle, high resolution and small dimension, and improving the assembly processing and achieving the low cost.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A wide angle lens, from an object side to an image side in sequence, comprising:
    a first lens having a negative refractive power, an image-side surface of the first lens being a concave surface;
    a second lens having a positive refractive power;
    a third lens having a positive refractive power, an object-side surface of the third lens being a convex surface, and an image-side surface of the third lens being a convex surface;
    a fourth lens having a negative refractive power;
    a fifth lens having a positive refractive power, an image-side surface of the fifth lens being a convex surface; and
    a sixth lens having a negative refractive power, an image-side surface of the sixth lens being a concave surface in a paraxial region,
    wherein, the wide angle lens satisfies a conditional expression: $1.0 \leq f2/f \leq 2.0$, $0.5 \leq f1/f4 \leq 1.5$, in which, f1 denotes an effective focal length of the first lens, f2 denotes an effective focal length of the second lens, f4 denotes an effective focal length of the fourth lens, and f denotes an effective focal length of the wide angle lens.

2. The wide angle lens according to claim 1, wherein the wide angle lens satisfies a conditional expression: $-1.6 \leq f2/f6 < -0.7$, in which, f2 denotes the effective focal length of the second lens, and f6 denotes an effective focal length of the sixth lens.

3. The wide angle lens according to claim 1, wherein the wide angle lens satisfies a conditional expression: $0.8 < Dr5r8/CT5 < 1.5$, in which, Dr5r8 denotes an axial distance between the object-side surface of the third surface and an image-side surface of the fourth lens, and CT5 denotes a center thickness of the fifth lens.

4. The wide angle lens according to claim 1, wherein the wide angle lens satisfies a conditional expression: $0.5 < DT11/DT62 < 0.9$, in which, DT11 denotes a maximum effective radius of an object-side surface of the first lens, and DT62 denotes a maximum effective radius of the image-side surface of the sixth lens.

5. The wide angle lens according to claim 1, wherein the wide angle lens satisfies a conditional expression: $0 < CT6/CT5 \leq 0.6$, in which, CT5 denotes a center thickness of the fifth lens, and CT6 denotes a center thickness of the sixth lens.

6. The wide angle lens according to claim 1, wherein the wide angle lens satisfies a conditional expression: $-3 < f4/f < -1$, in which, f4 denotes the effective focal length of the fourth lens, and f denotes the effective focal length of the wide angle lens.

7. The wide angle lens according to claim 1, wherein the wide angle lens satisfies a conditional expression: $0.8 \leq f5/f < 1.5$, in which, f5 denotes an effective focal length of the fifth lens, and f denotes the effective focal length of the wide angle lens.

8. The wide angle lens according to claim 1, wherein the wide angle lens satisfies a conditional expression: $0 < (R5+R6)/(R5-R6) < 1$, in which, R5 denotes a radius of curvature of the object-side surface of the third lens, and R6 denotes a radius of curvature of the image-side surface of the third lens.

9. The wide angle lens according to claim 1, wherein the wide angle lens satisfies a conditional expression: TTL/ImgH<2.4, in which, TTL denotes an axial distance between an object-side surface of the first lens and an imaging surface, and ImgH denotes a half of a diagonal line of an effective pixel area on the imaging surface.

10. The wide angle lens according to claim 1, wherein an image-side surface of the second lens is a convex surface, and the wide angle lens satisfies a conditional expression: 0<T23/CT2<0.1, in which, CT2 denotes a center thickness of the second lens, and T23 denotes an axial distance between the second lens and the third lens.

11. The wide angle lens according to claim 10, wherein an object-side surface of the sixth lens is a concave surface, and the wide angle lens satisfies a conditional expression: −0.8<SAG61/DT61<−0.4, in which, SAG61 denotes a sagitta of the object-side surface of the sixth lens, and DT61 denotes a maximum effective radius of the object-side surface of the sixth lens.

12. The wide angle lens according to claim 1, wherein an image-side surface of the second lens is a concave surface, and the wide angle lens satisfies a conditional expression: 0.5<R3/R4<1.0, in which, R3 denotes a radius of curvature of an object-side surface of the second lens, and R4 denotes a radius of curvature of the image-side surface of the second lens.

13. The wide angle lens according to claim 12, wherein the wide angle lens satisfies a conditional expression: −0.5< (R10+R11)/(R10−R11)<0, in which, R10 denotes a radius of curvature of the image-side surface of the fifth lens, and R11 denotes a radius of curvature of an object-side surface of the sixth lens.

* * * * *